United States Patent
Johnson et al.

(10) Patent No.: US 8,894,505 B2
(45) Date of Patent: Nov. 25, 2014

(54) FITTING SYSTEM FOR A GOLF CLUB

(71) Applicant: Acushnet Company, Fairhaven, MA (US)

(72) Inventors: Gregory D. Johnson, Carlsbad, CA (US); Ryan Margoles, Carlsbad, CA (US); Donald S. Bone, Escondido, CA (US)

(73) Assignee: Acushnet Company, Fairhaven, MA (US)

( * ) Notice: Subject to any disclaimer, the term of this patent is extended or adjusted under 35 U.S.C. 154(b) by 0 days.

(21) Appl. No.: 14/062,078

(22) Filed: Oct. 24, 2013

(65) Prior Publication Data

US 2014/0051526 A1   Feb. 20, 2014

Related U.S. Application Data

(63) Continuation-in-part of application No. 13/682,598, filed on Nov. 20, 2012, now Pat. No. 8,808,105, which is a continuation-in-part of application No. 13/117,308, filed on May 27, 2011.

(51) Int. Cl.
| | |
|---|---|
| *A63B 59/00* | (2006.01) |
| *A63B 24/00* | (2006.01) |
| *A63B 69/36* | (2006.01) |
| *A63B 53/10* | (2006.01) |

(52) U.S. Cl.
CPC ........... *A63B 53/10* (2013.01); *A63B 2213/002* (2013.01); *A63B 59/0074* (2013.01); *A63B 24/0003* (2013.01); *A63B 2220/40* (2013.01); *A63B 2220/833* (2013.01); *A63B 69/36* (2013.01); *A63B 2220/806* (2013.01)
USPC ............................ 473/289; 473/221; 473/409

(58) Field of Classification Search
CPC .... A63B 53/10; A63B 53/12; A63B 59/0074; A63B 24/0003; A63B 69/36; A63B 2220/18; A63B 2220/20; A63B 2220/51; A63B 2220/806; A63B 2220/807
USPC ................................. 473/289, 219, 221, 409
See application file for complete search history.

(56) References Cited

U.S. PATENT DOCUMENTS

| | | | |
|---|---|---|---|
| 3,945,646 A | | 3/1976 | Hammond |
| 4,682,504 A | * | 7/1987 | Kobayashi ...................... 73/854 |
| 5,351,952 A | | 10/1994 | Hackman |

(Continued)

OTHER PUBLICATIONS

Beam deflector test procedure, www.ce.memphis.edu, Oct. 27, 2011.*

*Primary Examiner* — Michael Cuff
(74) *Attorney, Agent, or Firm* — Randy K. Chang

(57) ABSTRACT

A method relating to an improved fitting system for a golf club shaft is disclosed herein. More specifically, the present invention utilizes specific data gathered from the golfer's golf swing itself to determine the best performing golf club shaft for this particular golf swing. Even more specifically, the present invention relates to the utilization of infrared motion capturing cameras to record the location data of a golf club shaft throughout a swing. Based on the location data captured, one or more dynamic behavioral characteristics can be calculated to determine one or more preferred shaft characteristics. Using the preferred shaft characteristics, a shaft can be recommended for the golfer having this particular golf swing. The current inventive fitting methodology is preferred to the archaic fitting method of using data gathered from the result orientated ball flight data together with a tedious process of having to try numerous different shafts.

11 Claims, 26 Drawing Sheets

(56) References Cited

U.S. PATENT DOCUMENTS

| | | | |
|---|---|---|---|
| 5,474,298 A | 12/1995 | Lindsay | |
| 5,591,091 A | 1/1997 | Hackman | |
| 5,638,300 A | 6/1997 | Johnson | |
| 5,823,878 A | 10/1998 | Welch | |
| 5,976,028 A * | 11/1999 | Ciccarello et al. | 473/289 |
| 6,083,123 A | 7/2000 | Wood | |
| 6,183,374 B1 * | 2/2001 | Onuki et al. | 473/289 |
| 6,250,168 B1 * | 6/2001 | D'Aguanno | 73/865.3 |
| 6,302,802 B1 | 10/2001 | Pao | |
| 6,514,081 B1 | 2/2003 | Mengoli | |
| 6,993,970 B2 * | 2/2006 | Weiss et al. | 73/579 |
| 7,024,953 B1 * | 4/2006 | Weiss | 73/865.9 |
| 7,041,014 B2 | 5/2006 | Wright et al. | |
| 7,166,035 B2 * | 1/2007 | Voges et al. | 473/222 |
| 7,219,033 B2 | 5/2007 | Kolen | |
| 7,264,554 B2 | 9/2007 | Bentley | |
| 7,381,139 B2 | 6/2008 | Weeks et al. | |
| 7,415,867 B2 * | 8/2008 | Spencer et al. | 73/65.03 |
| 7,686,701 B2 | 3/2010 | Hasegawa | |
| 7,704,157 B2 | 4/2010 | Shirai et al. | |
| 7,808,655 B2 * | 10/2010 | Weiss et al. | 356/601 |
| 7,870,790 B2 | 1/2011 | Sato et al. | |
| 7,887,440 B2 | 2/2011 | Wright et al. | |
| 8,118,687 B1 | 2/2012 | Galloway | |
| 2005/0011250 A1 * | 1/2005 | Nesbit et al. | 73/12.02 |
| 2007/0207873 A1 | 9/2007 | Rose | |
| 2010/0088043 A1 * | 4/2010 | Weiss et al. | 702/41 |
| 2011/0028248 A1 | 2/2011 | Ueda | |
| 2012/0052972 A1 | 3/2012 | Bentley | |
| 2012/0052973 A1 | 3/2012 | Bentley | |
| 2012/0169869 A1 * | 7/2012 | You et al. | 348/142 |
| 2012/0214606 A1 | 8/2012 | Ueda | |

* cited by examiner

FITTING SYSTEM FOR A GOLF CLUB

CROSS REFERENCE TO RELATED APPLICATION

The present application is a Continuation-In-Part of U.S. patent application Ser. No. 13/682,598, filed Nov. 20, 2012 and still pending, which is a Continuation-in-Part of U.S. patent application Ser. No. 13/117,308, filed on May 27, 2011 and still pending, the disclosures of which are hereby incorporated by reference in their entirety.

FIELD OF THE INVENTION

The present invention relates generally to an improved fitting system for golf club. More specifically, the present invention relates to using infrared motion capturing cameras to record a plurality of location data of the golf club shaft as the golfer performs a golf swing. The plurality of location data can then be used to calculate one or more dynamic behavioral characteristics of a golf club shaft throughout a golf swing; and uses that information to fit a golfer to a golf club shaft that will perform the best for him or her. Even more specifically, the improved fitting system for golf club shaft in accordance with the present invention utilizes an innovative methodology that processes the information gathered from the dynamic behavioral characteristics of a golf club throughout a golf swing and compares it to a plurality of one or more static shaft characteristics in order to determine the optimal performing shaft for that particular golf swing.

BACKGROUND OF THE INVENTION

Golf clubs come in many different sizes, shapes, and colors. However, despite all of the variations that can be found in different types of golf clubs, almost all of them have three essential components; a head, a grip, and a shaft connecting the head and the grip. The golf club head may generally refer to an object that is used to impact a golf ball located at a terminal end of a golf club. The grip may generally refer to an object located at a proximal end of the golf club, providing an interface for the golfer to grasp onto the golf club. Finally, the shaft may be a hollow cylindrical rod juxtaposed between the grip and the club head to provide a connection between the two components.

In order to improve the overall performance of a golf club, golf club designers have generally focused on improving the performance of all of the individual components independently. In one example, club heads have gotten bigger in size to increase the moment of inertia of the club head while at the same time also increasing the coefficient of restitution between the club head and the golf ball to allow the golf ball to be launched longer and straighter. In another example, golf club grips have evolved from leather wraps to rubber compounds that improve the durability and feel of the grip in a golfer's hand. Finally, in a further example, golf club shafts have morphed from wooden shafts to steel or carbon fiber shafts to provide more stability all while providing adjustments in the bending profiles of the shaft in order to further improve the overall performance of the golf club.

Although each component can help a golfer improve the overall performance, the exact optimization of each individual golfer's equipment can be a complicated art. Because each individual has a different golf swing with potentially dramatic variations from other individuals, the determination of an optimal performing golf club for that specific golfer can not be accomplished from a one size fits all approach. In fact, one of the most mystifying aspects of the sport of golf is the determination of the proper golf club shaft for a specific golfer to allow him to optimize the performance criteria of the entire golf club.

Currently in the field, the determination of what an optimal golf club shaft for a particular golfer may generally involve a lot of guesswork, with very little repeatability. Typically, a golfer starts out by testing as many different types of shafts as possible in order to guess at the ultimate selection based upon the feel of the club and/or the launch characteristics of the golf ball. This process may be improved if the golfer seeks the advice of a professional fitter who can make more of an educated guess based on his experience, but the entire process still comes down to a lot of trial and error. This archaic process of fitting a golfer for a golf club is not only inefficient, but it is also inaccurate, inconsistent, unreliable, and not easily repeatable.

In order to address the fitting problem discussed above, U.S. Pat. No. 5,351,952 to Hackman discloses a method that measures the swing time of a golfer's swing and selects a club having the inverse of four times its natural frequency which is approximately equal to the swing time. In a preferred embodiment, an accelerometer is mounted within the club head and is connected to an electronic data process, and a graph of clubhead acceleration versus time is plotted, allowing the swingtime to be measured.

U.S. Pat. No. 6,083,123 to Wood provides another methodology to attempt to debunk the mystery that is involved in the proper fitting of a golf club to a golfer by using combinatorial logic at both the global and local levels of a computer implemented method. The input parameters of this methodology utilize the speed, tempo, face angle, dynamic loft, trajectory, dynamic lie, rotation, and height, amongst other characters to predict an ideal golf club for the golfer.

Although both of the above mentioned methodologies of shaft fitting are viable attempts to provide some sort of format and guidance to improve on the archaic guesstimate fitting method of the past, it falls short in not extracting the behavioral information of the shaft. Although various other result related data can all help with the proper fitting of a golfer to his specific shaft, the most important information that can be gathered has to be derived from the shaft itself; as it is the shaft deflection that ultimately affects how the golf club head contacts the golf ball.

Hence, it can be seen, there exists a need for a golf club shaft fitting system that utilizes the behavior of the shaft as dictated by player's unique swing to determine the optimal fit of a specific golf swing. More specifically, there is a need in the field for a fitting system that captures the behavioral information of a golf club shaft throughout the golf swing itself; and utilizes that behavioral information to determine the optimal golf club shaft based on that behavioral information.

BRIEF SUMMARY OF THE INVENTION

One aspect of the present invention is a method of fitting a golfer to a recommended shaft comprising the steps of selectively positioning a plurality of markers on a golf club as well as selectively positioning a plurality of cameras, adapted to react to the plurality of markers, around the golfer. Once the cameras and markers are set up, the current method captures a plurality of location data of the plurality of markers using the plurality of cameras, as the golfer performs a golf swing. Based on the plurality of location data of the markers, the current method calculates one or more dynamic behavioral characteristics in order to determine one or more preferred static shaft characteristics in order to select the recommended shaft that has one or more static shaft characteristics that most closely resemble the preferred static shaft characteristics. Preferably, the current method determines one or more behavioral characteristics in order to determine preferred static shaft characteristics such that a family of shafts having similar shaft response profiles but differing mechanical shaft characteristics such as shaft weight and shaft length can be identified from a plurality of shaft families.

Another aspect of the present invention is a method of fitting a golfer to a recommended shaft comprising the steps of selectively positioning a plurality of markers on a golf club as well as selectively positioning a plurality of cameras, adapted to react to the plurality of markers, around the golfer. Once the cameras and markers are set up, the current method captures a plurality of location data of the plurality of markers using the plurality of cameras, as the golfer performs a golf swing. Using the plurality of location data, a computer processor is used to create a digital swing model of the golfer's swing; while a plurality of digital shaft models are also created from one or more static shaft characteristics of a plurality of different shafts. Once a digital swing model and a plurality of digital shaft models are created, the digital swing model is combined with the plurality of shaft models to create a plurality of modified digital swings, which can be used to determine a plurality of performance results. After the plurality of performance results are simulated for each of the plurality of modified digital swings, a recommended shaft can be selected based on which one of the plurality of the plurality of performance results ends up working best for the particular golfer's golf swing.

In a further aspect of the present invention is an apparatus for fitting a golfer to a recommended shaft comprising, a plurality of reflective markers positioned on a golf club as it is being swung by a golfer, a plurality of IR cameras positioned around the golfer adapted to capture a plurality of location data of the plurality of reflective markers, and a computer processor connected to the plurality of IR cameras, wherein the computer processor is adapted to receive the plurality of location data to calculate one or more dynamic behavioral characteristics and determine a preferred static shaft characteristic based on the dynamic behavioral characteristics in order to select the recommended shaft.

In an even further aspect of the present invention is a method of fitting a golfer to a recommended shaft comprising the steps of a selectively positioning a plurality of sensors on a golf club, capturing a plurality of location data from the sensors using a computer processor, as the golfer performs a golf swing, calculating one or more dynamic behavioral characteristics of the golf club based on the plurality of location data of the sensors throughout the golf swing, determining one or more preferred static shaft characteristics based on the one or more dynamic behavioral characteristics, and selecting the recommended shaft having one or more static shaft characteristics that most closely resembles the one or more preferred static shaft characteristics.

In yet another aspect of the present invention, a plurality of shaft families are created to better fit a golfer, such that each shaft in a family has a similar shaft response element as identified from static shaft tests, but each shaft in the family has a different mechanical shaft characteristic, such as shaft weight, shaft length and/or shaft EI profile. In this embodiment, a golfer's swing force profile can be determined and then a shaft family having a shaft response profile can be selected that matches the golfer's swing force profile. The individual golfer can then be fit with the best shaft from the shaft family based on the golfer's preferences.

In another embodiment of the present invention, a plurality of shaft families for fitting a golfer can be created. The families preferably have a first shaft family having a plurality of shafts, each shaft having a first similar shaft tip outward angle, a shaft tip downward angle, a torque angle, and an amount of deflection under an applied load in a static load test and each shaft having a different mechanical shaft characteristic selected from the group of shaft length, shaft weight, shaft EI profile or a combination. A second shaft family also has a plurality of shafts, each shaft having a second similar shaft tip outward angle, a shaft tip downward angle, a torque angle, and an amount of deflection under an applied load in a static load test that is different than the first and each shaft having a different mechanical shaft characteristic selected from the group of shaft length, shaft weight, shaft EI profile or a combination thereof. Preferably, the family is comprised of shafts having weights of about 40 grams, 50 grams, 60 grams, 70 grams, 80 grams, 90 grams and 100 grams. More preferably, the shafts have weights from about 50 grams to about 80 grams. In another embodiment, the family is comprised of shaft lengths to create overall club length of about 43 inches to about 48 inches, in ½ inch increments. Most preferably, the family is comprised of shafts having lengths to create overall club lengths of about 45 to 46 inches, in ½ inch increments.

These and other features, aspects and advantages of the present invention will be better understood with references to the following drawings, description and claims.

BRIEF DESCRIPTION OF THE DRAWINGS

The foregoing and other features and advantages of the invention will be apparent from the following description of the invention as illustrated in the accompanying drawings. The accompanying drawings, which are incorporated herein and form a part of the specification, further serve to explain the principles of the invention and to enable a person skilled in the pertinent art to make and use the invention.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any or all of the problems discussed above or may only address one of the problems discussed above. Further, one or more of the problems discussed above may not be fully addressed by any of the features described below.

Although each and every single golfer struggles to have a picturesque model golf swing time after time, the reality of the situation is that many of us have different swing tendencies that deviate from what an idealized golf swing should look like. In fact, it can be argued that no two golfers in the world may have identical golf swings, making each individual golfer unique in his or her own right. Each golfer can produce different swing forces and, moreover, have different subjective preferences such as overall club weight. Hence, based on the above, it can be deduced that the needs of a golfer may be dramatically different from one another, making the selection of his or her golf club a personalized process. Furthermore, it is difficult to fit each golfer, when the golfer is fit to a particular shaft, but wants a different weight or length, which can dramatically change the characteristics of the shaft. Thus, having a plurality of shaft families to fit with greatly enhances the ability to meet a golfer's expectations.

The existence of such a need is evident in the golfing community, as more and more emphasis has been placed on proper fitting of a golfer to optimize the performance of the golfer's equipment, for his or her particular swing. However, up till this point, the personalization process for a golfer in selecting his or her best performing golf club has been a mysterious compilation of numerous trial and error attempts. Hence, in order to address this deficiency the present invention has created an apparatus and method that can effectively, efficiently, and predictably help a golfer determine the golf club setup that helps optimize his or her equipment to his or her particular golf swing.

Figure 1:
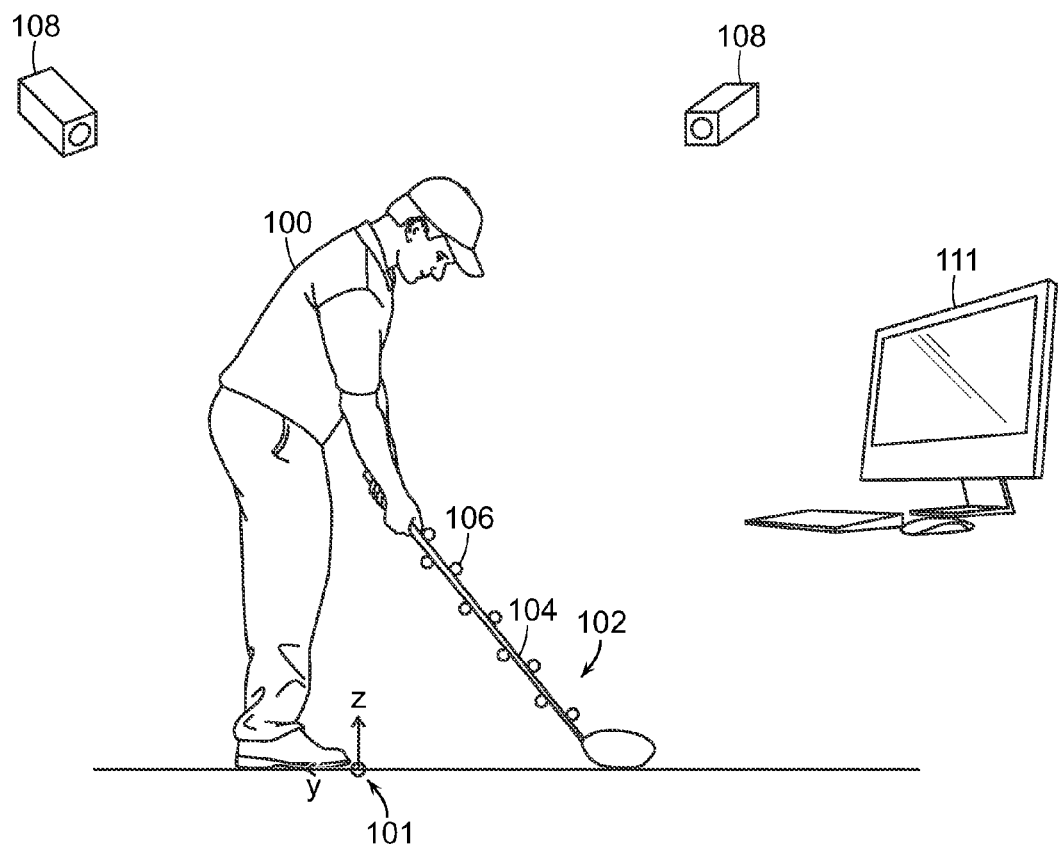
FIG. 1 shows a down the line view of a golfer situated in the platform used for fitting in accordance with an exemplary embodiment of the present invention.

FIG. 1 of the accompanying drawings shows a down-the-line view of a set-up that can be used to fit a golfer 100 in accordance with an exemplary embodiment of the present invention. More specifically, FIG. 1 of the accompanying drawings shows a golfer 100 holding a golf club 102 that has a plurality of markers 106 selectively positioned on the golf club 102. In addition to the above, FIG. 1 also shows a plurality of cameras 108 positioned around the golfer 100 in a way that surrounds the golfer 100. The plurality of cameras 108, as discussed in this exemplary embodiment of the present invention, may generally be adapted to identify and react to the plurality of markers 106; allowing the cameras 108 to capture the location of the plurality of markers 106 at all times. Based on the location of the plurality of markers 106, the current invention uses a computer processor 111 programmed to process the data captured by the plurality of cameras 108 and determine the optimal golf club shaft suitable for the specific golfer's 100 golf swing.

The plurality of cameras 108 associated with this embodiment of the present invention may include electronic sensors or chips that react to light sources and record them. These types of sensors are typically found in digital cameras; as such types of cameras are especially suited to obtain multiple high quality images in a short period of time. The electronic sensor or chip may be selectively activated or deactivated at desired intervals in order to obtain two or more time-spaced images. Of course, it is desirable for the camera to be capable of acquiring images of light from within the Infrared (IR) spectrum, though the camera does not have to be limited to acquiring light only images, and can acquire photographic images without departing from the scope and content of the present invention. More detail information about the operation of high speed camera 108 may be found in commonly owned U.S. patent application Ser. No. 11/364,343 to Rose, the disclosure of which is incorporated by reference in its entirety.

In addition to the above, the plurality of high speed cameras 108 may generally need to have a high acquisition rate. Having a higher acquisition rate is desirable in the current embodiment because it allows for more images to be captured throughout the golfer's 100 golf swing, allowing for more data points to be collected to increase the accuracy of the calculations. More specifically, the plurality of high speed cameras 108 may generally have an acquisition rate of greater than about 250 frames/second, more preferably greater than about 500 frames/second, and most preferably greater than about 750 frames/second. It is worth noting here that the quality of the image captured is not solely dependent on the acquisition frame rate alone, but is also a function of the shutter speed. Shutter speed of a high speed camera 108 is important to the quality of the image captured because it defines the exposure time; and in the current exemplary embodiment, a quick shutter speed is desired to increase the ability of the camera to accurately capture a moving object. More specifically, the shutter speed used in accordance with the current exemplary embodiment of the present invention may generally be greater than about $\frac{1}{3000}$ seconds, more preferably greater than about $\frac{1}{4000}$ seconds, and most preferably greater than about $\frac{1}{4500}$ seconds.

Because the plurality of cameras 108 in accordance with the current exemplary embodiment of the present invention are focused on light wavelengths within the IR spectrum, it is important that that an IR illumination source accompanies the plurality of cameras 108. IR illuminators, as discussed in the current embodiment, may generally be positioned such that they are capable of illuminating a predetermined point of view for the specific camera 108 that it is accompanying. The field of view of the IR illuminators may generally coincide with the field of view of the cameras 108, displacing enough light to reach the plurality of markers 106 positioned on the golf club itself. It should be noted that although the source of the IR illumination may most preferably stem from the plurality of cameras 108 themselves, they can stem from any other location without departing from the scope and content of the present invention, so long as they are capable of providing sufficient IR light to the plurality of markers 106.

The plurality of cameras 108 in accordance with the present invention may generally mean two or more cameras 108, as shown in FIG. 1 of the accompanying drawings. Having multiple cameras 108 is important to the ability of the current invention to capture, in sufficient detail, enough data points of the golf club throughout the swing; especially considering that the view of some of the markers 106 may be blocked by the golfer at various positions throughout a golf swing. Although there is not a specific number of cameras that are required for the proper functionality of the current invention, the present invention may generally have more than about 3 cameras 108, more preferably greater than about 9 cameras 108, and most preferably greater than about 15 cameras 108 to ensure sufficient coverage to create a comprehensive field of view.

Plurality of markers 106 in accordance with the present invention may generally be placed on the golf club 102 itself; however, markers could be placed on the golfer 100 in addition to the golf club 102 to capture certain swing characteristics without departing from the scope and content of the present invention. In the current embodiment, the plurality of markers 106 may generally contain multiple markers to accurately capture the dynamic behavioral characteristics of a golf club 102 at multiple locations of the golf club 102 throughout a golf swing; however, a lesser number of markers could also be used to achieve the same objectives without departing from the scope and content of the present invention if data only needs to be gathered from a limited number of locations. More specifically, the plurality of markers 106 may generally be greater than about 3 markers 106, more preferably greater than about 5 markers 106, most preferably greater than about 8 markers 106. It is worth noting here that although the exact number of markers 106 is not crucial to proper functionality of the present invention, the present invention requires at least 3 markers 106, as that is the minimum number of markers 106 required to triangulate the orientation and position of the golf club 102 in three dimensional space. The triangulation of the position of the golf club 102 may generally involve the identification of the angle between the plurality of cameras 108 and each of the individual markers 106; however, numerous other methodologies may be used without departing from the scope and content of the present invention. More details regarding the composition, operation, and usage of the markers 106 may be found in commonly owned U.S. patent application Ser. No. 11/364,343 to Rose, the disclosure of which is, once again, incorporated by reference in its entirety.

Figure 2:
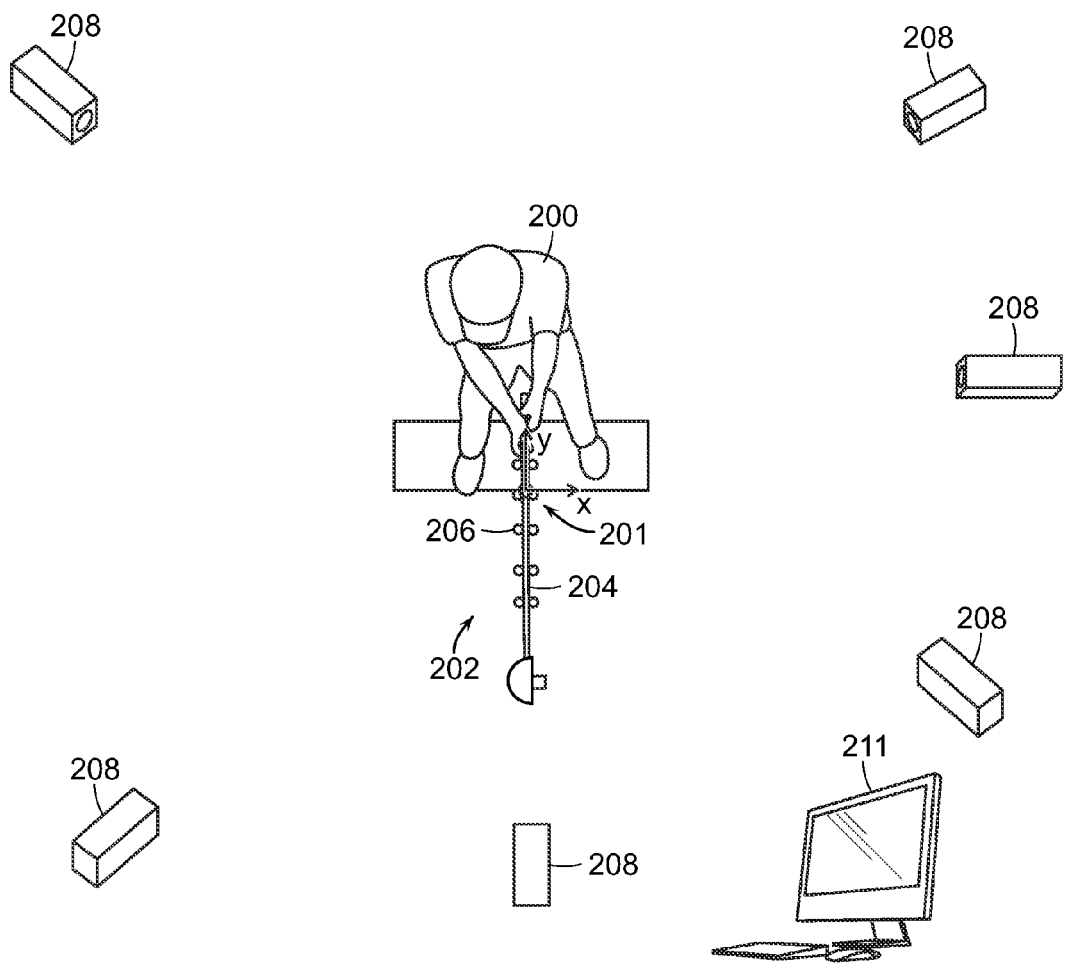
FIG. 2 shows a top down view of a golfer situated in the platform used for fitting in accordance with an exemplary embodiment of the present invention.

Before moving onto FIG. 2, it is worth mentioning here that FIG. 1 also shows a coordinate system 101 identifying the y-axis and the z-axis. More specifically, the origin of the coordinate system 101 is located on the ground plane, at a location that is at the middle of the golfer's stance, near the tip of his toes; with the y-axis pointing towards the golfer's heel and the z-axis pointing at the golfer's head. It is important here to establish a coordinate system 101 because future references of the location of the plurality of cameras 108 will be referred to using this coordinate system 101.

FIG. 2 of the accompanying drawings shows a top-down view of a set-up that can be used to fit a golfer 200 in accordance with an exemplary embodiment of the present invention. Although FIG. 2 doesn't add additional components to what has already been shown in FIG. 1, this different view provides additional information that can't be shown in the down-the-line view shown in FIG. 1. More specifically, FIG. 2 of the accompanying drawings provides more information on the coordinate system 201 by illustrating the orientation of the x-axis and the y-axis, providing the final piece of the puzzle that completes the coordinate system 201. In addition to providing the final piece of the coordinate system 201, FIG. 2 also shows multiple cameras 208 being placed at numerous locations that surround the golfer 200. Although the exact number of camera 208 are not critical to the proper functionality of the present invention, FIG. 2 provides an illustration of the potential locations of the cameras 208 that can be used to surround the golfer 200 to sufficiently capture the movement of the markers 206 throughout the golf swing.

The top-down view of this current exemplary set-up also shows a very important relationship between the placements of all the cameras 208. More specifically, it is important to recognize that the placement of cameras 208 favor the front of the golfer 200 to focus more on the front of the golfer 200 as he performs a golf swing. Alternatively speaking, the number of cameras 208 placed in front of the golfer in the negative y-direction is greater than the number of cameras 208 placed behind the golfer in the positive y-direction by at least one; for a right handed golfer. Needless to say, the orientation and placement of the cameras 208 described above would be reversed for a left handed golfer. It is important to have more cameras located near the front of the golfer 200 as it is beneficial for the cameras 208 to capture as much of the golf swing as possible and because the view of the golf club 202 itself can be blocked by the golfer 200 themselves at certain points in the swing, as it is beneficial for the cameras 208 to capture the golf club for as much of the golf swing as possible.

Finally, FIG. 2 also shows a computer processor 211 used to capture the information gathered by the plurality of cameras 208. In one exemplary embodiment of the present invention, the plurality of cameras 208 may generally be connected to the computer processor 211, either physically or wirelessly, allowing the location data captured by the cameras to be processed and analyzed by the computer processor 211.

Figure 3:
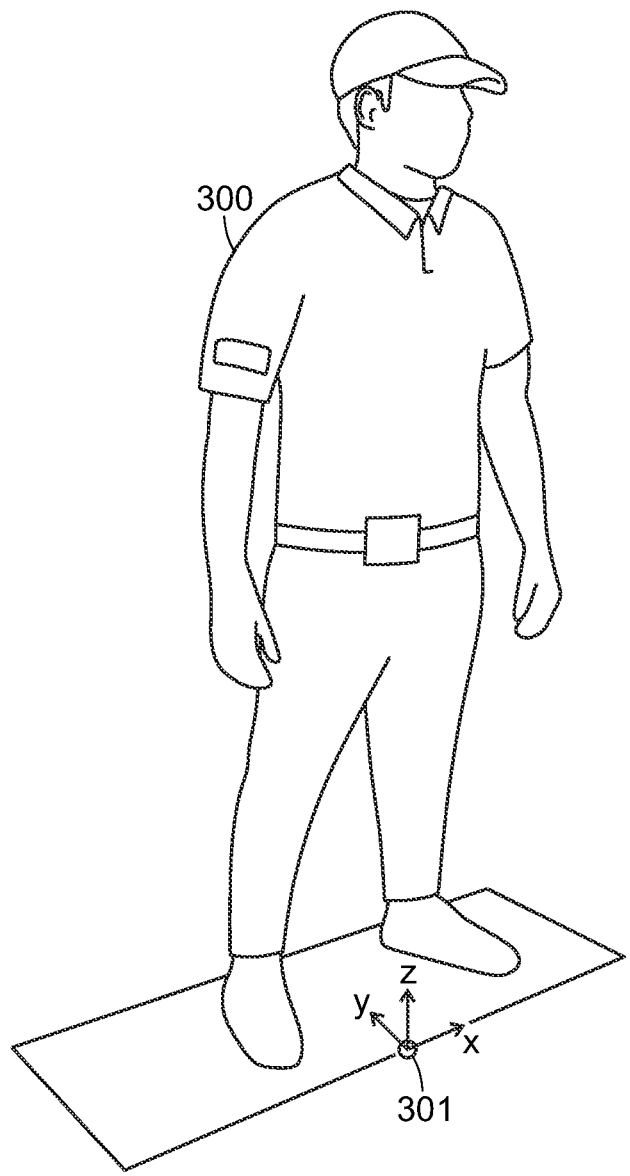
FIG. 3 shows a perspective view of a golfer positioned relative to the origin of the coordinate system in accordance with an exemplary embodiment of the present invention.

FIG. 3 of the accompanying drawings shows an enlarged perspective view of a golfer 300 in accordance with the present invention showing the exact location of the coordinate system 301 in three dimensional space. In this figure, it can be seen that the x-axis points to the left of the golfer, the y-axis points towards the rear of the golfer, and the z-axis points up above the golfer.

Figure 4:
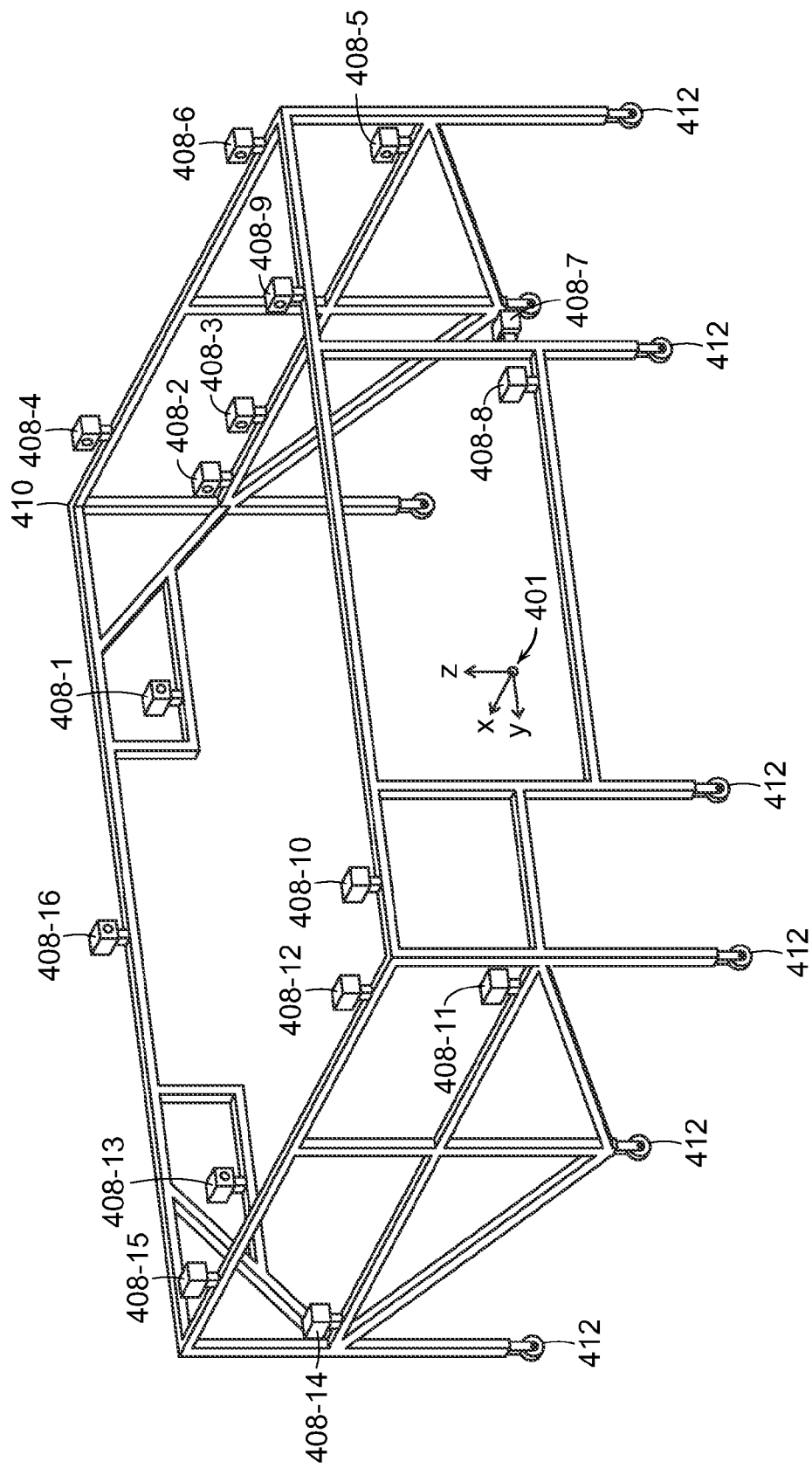
FIG. 4 shows a perspective view of the camera mount apparatus in accordance with an exemplary embodiment of the present invention.

Returning to the importance of the location of the coordinate system 301 shown in FIG. 3, FIG. 4 of the accompanying drawings illustrates the importance of the coordinate system 401 as the positions of the plurality of cameras 408 are defined relative to the coordinate system 401. Before the specific location of each of the individual cameras 408 is defined, it should be noted that the number of cameras 408 and their specific locations are not critical to the proper functionality of the present invention. In fact, any number of cameras 308 more or less than the number described can be used, and the following discussion only describes the location of the each of the cameras 408 in accordance with one specific embodiment of the present invention.

Keeping in mind that all distances are referenced from the origin of the coordinate system 401, in the embodiment shown in FIG. 4, camera 408-1 is placed at a coordinate of (8.18, −6.78, 9.40), camera 408-2 is placed at a coordinate of (8.55, −10.40, 6.36), camera 408-3 is placed at a coordinate of (3.85, −12.53, 6.39), camera 408-4 is placed at a coordinate of (3.12, −12.6-, 9.89), camera 408-5 is placed at a coordinate of (−5.75, −13.10, 5.36), camera 408-6 is placed at a coordinate of (−7.95, −12.69, 9.95), camera 408-7 is placed at a coordinate of (−9.55, −6.74, 4.00), camera 408-8 is placed at a coordinate of (−9.55, −5.71, 6.21), camera 408-9 is placed at a coordinate of (−9.64, −6.58, 9.98), camera 408-10 is placed at a coordinate of (−9.57, 6.24, 9.67), camera 408-11 is placed at a coordinate of (−10.01, 8.95, 6.38), camera 408-12 is placed at a coordinate of (−7.71, 12.67, 10.0), camera 408-13 is placed at a coordinate of (3.51, 12.42, 9.97), camera 408-14 is placed at a coordinate of (7.45, 11.24, 6.10), camera 408-15 is placed at a coordinate of (8.56, 6.53, 9.75), and camera 408-16 is placed at a coordinate of (7.53, 0.73, 13.21), with the units of each of the distances in feet.

Similar to the simplified illustration shown in FIG. 2, the specific coordinate system of each of the individual cameras 408 affirms that there are more cameras located in front of the golfer than it is behind the golfer. In this embodiment of the present invention, we can focus on the y coordinate system as an indication of the placement of the individual cameras 408. Here, based on the number above, we can see that cameras 408-1 through 408-9 all have a negative value along the y-axis, indicating that they are placed in front of the golfer. Needless to say, if the golfer is left handed, there will be more cameras with a positive value in the y-axis of the coordinate system location.

In addition to showing the location of each of the plurality of cameras 408, FIG. 4 of the accompanying drawings also shows the cameras being mounted on a movable camera bay 410 for ease of shifting the entire fitting operation without having to replicate the exact location of each of the individual cameras 408. The movable camera bay 410, as shown in this current exemplary embodiment of the present invention, may rest on a plurality of wheels 412 to further increase the mobility of the entire camera 408 configuration without departing from the scope and content of the present invention. Although the movable camera bay 410 resting on a plurality of wheels 412 is the preferred embodiment, the plurality of cameras 408 may be permanently mounted on any fixture, wall, tripod, or any other apparatus to achieve the same goals without departing from the scope and content of the present invention.

Figure 5:
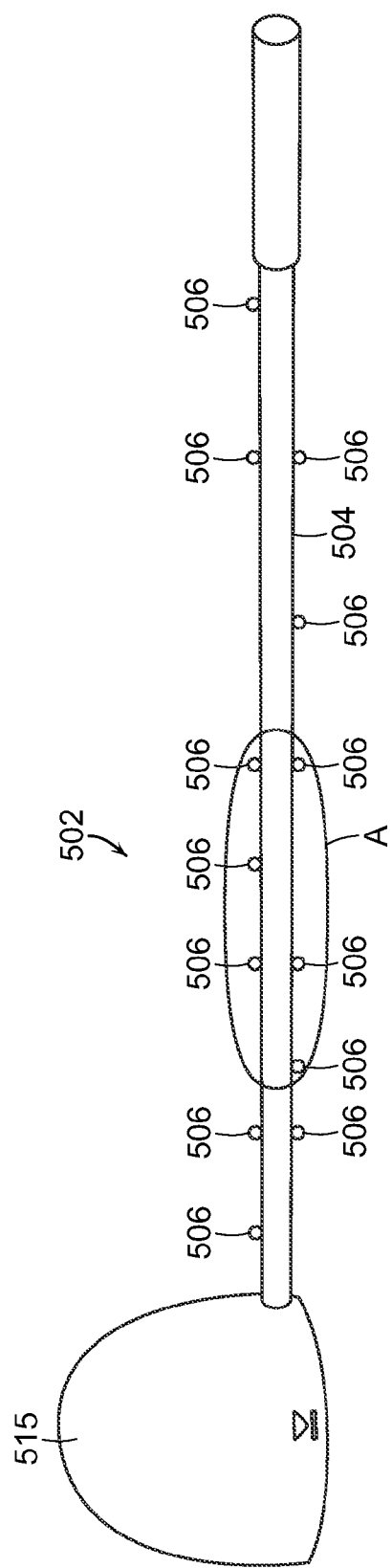
FIG. 5 shows a perspective view of a golf club including a plurality of retroreflective sensors in accordance with an exemplary embodiment of the present invention.

FIG. 5 of the accompanying drawings shows a perspective view of a golf club 502 in accordance with an exemplary embodiment of the present invention. More specifically, FIG. 5 allows the relationship between the shaft 504 and the plurality of markers 506 to be shown with more clarity. First, it can be seen from FIG. 5 the proximity of the plurality of markers 506 to each other gets smaller as the markers 506 are placed closer to the terminal end of the golf club 504 that contains the club head 515. This clustering of the markers 506 near the club head 515 is done to achieve better resolution of data near the club head 515 portion of the golf club 502, as the golf club shaft 504 tends to be more active near the tip.

In addition to the above, FIG. 5 of the accompanying drawings also shows the plurality of markers 506 being organized in clusters of three. This specific grouping of the plurality of markers 506 in clusters of three is crucial because it allows for proper determination of all the variables needed to be captured, including but not limited to the movement in the x-direction, movement in the y-direction, movement in the z-direction, and rotational movement of the various markers 506 relative to one another. Despite the above requirement for the plurality of markers 506 to be provided in groups of three, it can be seen from FIG. 5 that some markers can be shared by different groupings to satisfy the necessary info to capture the required data.

Figure 6:
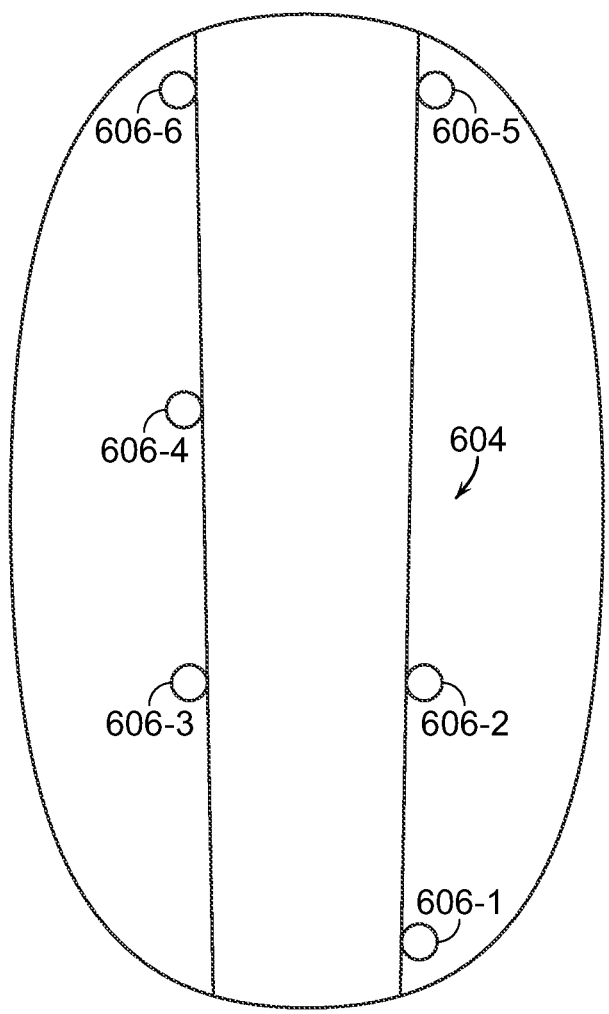
FIG. 6 shows an enlarged view of the shaft of the golf club shown in FIG. 5 allowing more visual clarity of the placement of the plurality of retroreflective sensors.

FIG. 6 shows an enlarged view of portion A of the shaft 502 shown in FIG. 5 to further illustrate the clustering of the markers 505 in accordance with the prior discussion. The plurality of markers 606 have been individually identified for ease of reference to the grouping. Here, it can be seen that one group may consist of markers 606-1, 606-2, and 606-3 to complete the requisite group of three markers. Another group that can be formed can comprise of 606-2, 606-3, and 606-4, illustrating another group of three markers. Marker 606-4 can also be used to complete another group of three markers that comprises of 606-4, 606-5, and 606-6; meaning that segregated markers such as 606-1 and 606-4 can be used multiple times to complete different groupings of the requisite three number of markers 606.

Figure 7:
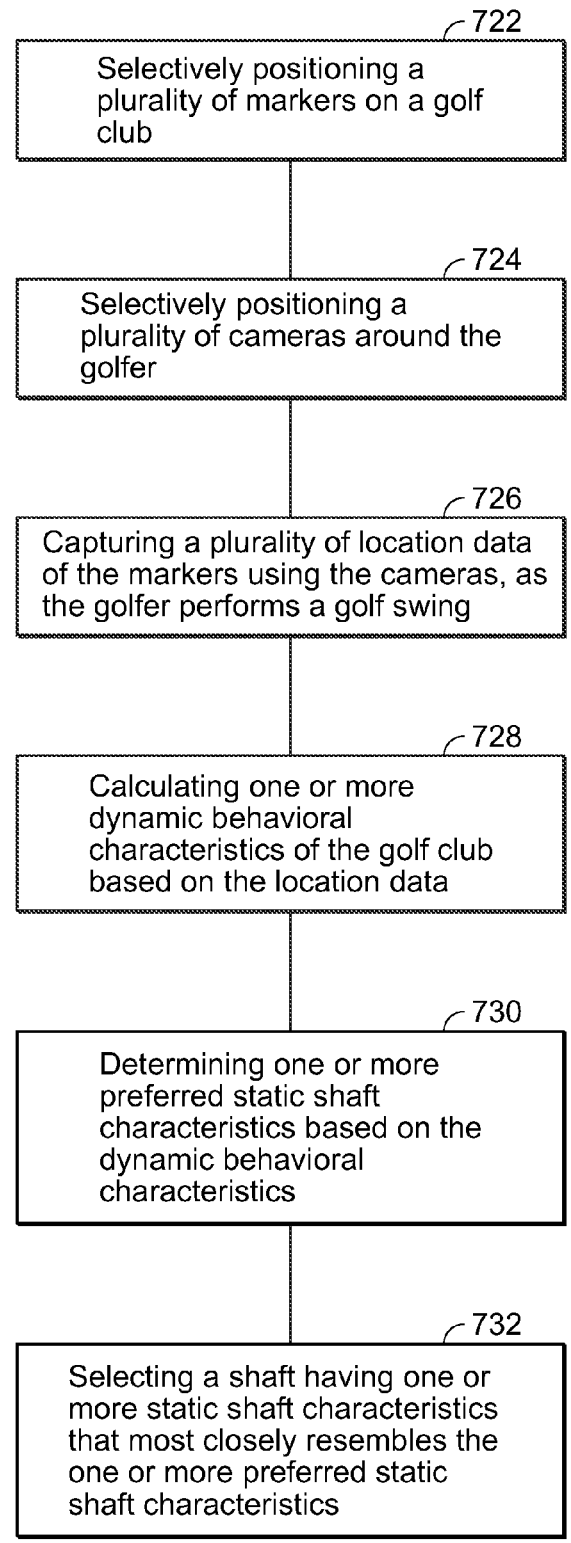
FIG. 7 shows a flow chart of a fitting methodology in accordance with an exemplary embodiment of the present invention.

Now that the components needed to perform the fitting have been explained, FIG. 7 of the accompanying drawings shows a flow chart explaining the steps involved with a fitting system in accordance with the present invention. In one exemplary embodiment of the present invention, the invention begins at step 722 by selectively positioning a plurality of markers on a golf club. Step 724 then follows by selectively positioning a plurality of cameras around the golfer, wherein the plurality of cameras are adapted to react to the plurality of markers. Once the markers and cameras are setup, step 726 requires the plurality of cameras to capture a plurality of location data of the plurality of markers as the golfer performs a golf swing. It should be noted that in this current exemplary embodiment of the present invention, the plurality of location data captured in step 726 may generally be presented in a Cartesian coordinate system relative to the origin 101 (see FIG. 1); however, numerous other coordinate systems could be used to capture the plurality of location data without departing from the scope and content of the present invention.

Once the plurality of location data is captured, step 728 of the present invention calculates one or more dynamic behavioral characteristics of the golf club based on the plurality of location data. This plurality of behavioral characteristics may generally refer to the certain behaviors of the golf club that could affect its overall performance. More specifically, the plurality of behavioral characteristics may include characteristics such as takeaway max lead, takeaway max lag, takeaway lead duration, takeaway lag duration, takeaway lead/lag recovery point, downswing max lead, downswing max lag, downswing lead duration, downswing lag duration, downswing lead/lag recovery point, takeaway max droop, takeaway max drift, takeaway droop duration, takeaway drift duration, takeaway droop/drift recovery point, downswing max droop, downswing max drift, downswing droop duration, downswing drift duration, downswing droop/drift recovery point, kick velocity, kick acceleration, takeaway max positive torque, takeaway max negative torque, downswing max positive torque, downswing max negative torque to name a few. However, the present invention should not be limited to the behavioral characteristics articulated above, but any other number of behavioral characteristics that could be extracted from the plurality of location data can also be used without departing from the scope and content of the present invention.

Once the plurality of behavioral characteristics have been calculated in step 728, step 730 uses the plurality of behavioral characteristics to determine one or more preferred static shaft profiles. Preferred static shaft profiles are demonstrated by testing as set forth in more detail below by static weight tests and measuring the shaft deflections and torsion. By manufacturing a plurality of shafts that have similar static shaft profiles, a family of shafts can be created. Each of these shafts preferably have different mechanical characteristics, as referred to in this exemplary embodiment of the present invention, such as shaft length, shaft weight, shaft frequency, shaft torque, shaft flex, and shaft EI profile. However, the present invention should not be limited to the static shaft characteristics articulated above, but any other number of static shaft characteristics that could be used to represent the performance of a shaft without departing from the scope and content of the present invention.

The preferred static shaft characteristics determined above can then be used to select a recommended shaft for the golfer in step 732, wherein the recommended shaft will have one or more static shaft characteristics that most closely resembles the one or more preferred static shaft characteristics. The selection of the recommended shaft in step 732 may generally involve a complicated process of selecting from a myriad number of shafts available in the industry. However, because the preferred static shaft characteristics have already been determined in step 730, the current selection of a shaft can be a simple methodical process of focusing on the any of the preferred static shaft characteristics and finding a shaft that matches those already determined characteristics.

In another preferred embodiment, step 732 can comprise the steps of selecting the preferred shaft family that most closely resembles the proper shaft performance response and then subsequently selecting a shaft that has the preferred mechanical characteristics to match the golfer's preferences from the shaft family.

Although the above process may appear complicated, most of the complicated steps such as step 728, step 730, and step 732 can all be completed by a computer processor. The current inventive fitting methodology becomes even more simplistic when compared to the existing archaic fitting methodology that would require the golfer to swing multiple shafts in a trial and error system to determine the optimal performing shaft for him.

Figure 8A:
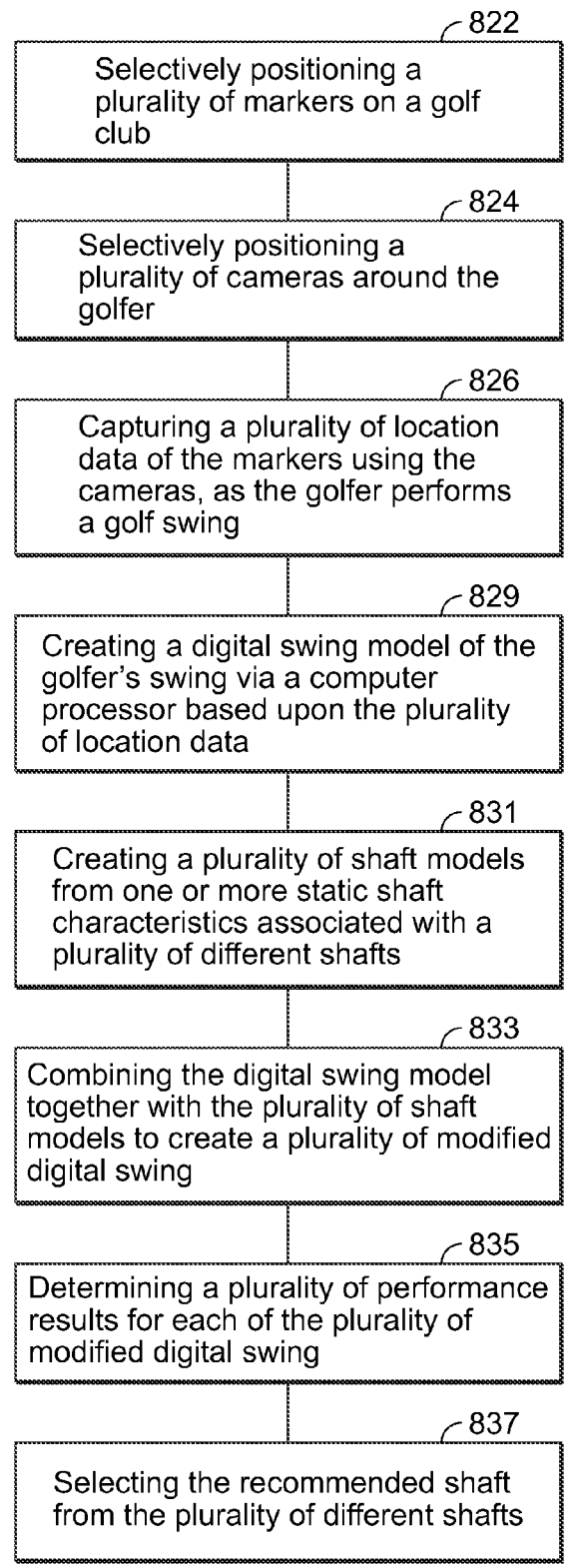
FIG. 8a shows a different flow chart of a different fitting methodology in accordance with an alternative embodiment of the present invention.

FIG. 8a of the accompanying drawings shows an alternative methodology in accordance with an alternative embodiment of the present invention. Alternative methodology shown in FIG. 8a starts off very similar to the methodology described in FIG. 7. In fact, steps 822, 824, and 826 are identical to steps 722, 724, and 726. However, after the plurality of location data has been captured in step 826, this alternative embodiment of the present invention utilizes computer processor to create a digital swing model based on the plurality of location data in step 829. The creating of this digital swing model in step 829, in accordance with this exemplary embodiment of the present invention, may generally involve using a finite element method to generate the digital swing model. In one exemplary embodiment of the present invention, this digital swing model may utilize a basic golf swing model in combination with the plurality of location data gathered in step 829, resulting in a swing model that most closely resembles the golfer's golf swing.

Once the digital swing model is created in step 829, step 831 creates a plurality of digital shaft models based upon one or more static shaft characteristics associated with a plurality of different shafts. During this step, a computer processor is once again used to create digital shaft models based upon known static mechanical shaft characteristics of different shafts. Known static mechanical shaft characteristics, as referred to in this current embodiment of the present invention, may generally comprise of characteristics such as shaft length, shaft weight, shaft frequency, shaft torque, shaft flex, and shaft EI profile. Preferably, the shafts have a shaft length to create an overall club length of between about 43 inches to about 47 inches for a driver and the shaft weights are between about 40 grams and about 100 grams. Generally, shafts are provided in ½ inch increments and/or 10 gram increments. However, the present invention should not be limited to the static shaft characteristics articulated above, but any other number of static shaft characteristics that could be used to determine the performance of a shaft without departing from the scope and content of the present invention.

Once the digital swing model and the plurality of digital shaft models are created in steps 829 and 831 respectively, step 833 combines the two digital models to create a plurality of modified digital golf swings. The plurality of modified digital golf swings, incorporating the digital swing model of the particular golfer together with a plurality of digital shaft models, allows the computer processor to simulate multiple scenarios of the particular golfer hitting a golf ball with different shafts with different static shaft characteristics. These multiple scenarios created in step 833 can then be used to determine the performance results of each of these scenarios in step 835. More specifically, step 835 of the current exemplary embodiment of the present invention determines a plurality of shaft performance results for each of the plurality of modified digital golf swings.

The determination of these performance results as described in step 835 of the present invention may generally involve using the plurality of cameras to focus on the performance of the golf club and golf ball during impact; however numerous other methodologies including a traditional launch monitor could be used without departing from the scope and content of the present invention so long as it is capable of capturing performance results. Performance results, as described in this current exemplary embodiment of the present invention, may generally contain one or more of the following specific measurements: club head speed, ball speed, launch angle, descent angle, spin rate, attack angle, club path, carry distance, total distance, and dispersion. It should be noted that the list of performance results is not an exhaustive list, but many other measurements can be gathered to provide performance results without departing from the scope and content of the present invention.

In the final step 827 of this current exemplary embodiment of the present invention, the recommended shaft for this particular golfer could be selected from the plurality of different shafts. The selection of the recommended shaft may generally be based on the plurality of performance results gathered step 835, wherein the computer processor could easily compare and contrast the performance results to determine the recommended shaft. In an alternative embodiment of the present invention, the final step 827 could offer a recommended family of related shafts and then allowing the golfer to select a shaft from the proper shaft family without departing from the scope and content of the present invention. In other words, a golfer can be properly fit into a family of shafts selected from a plurality of shaft families based on the performance characteristics, and then fit to the preferred shaft within the family based on mechanical shaft characteristics such as weight or length.

Figure 8B:
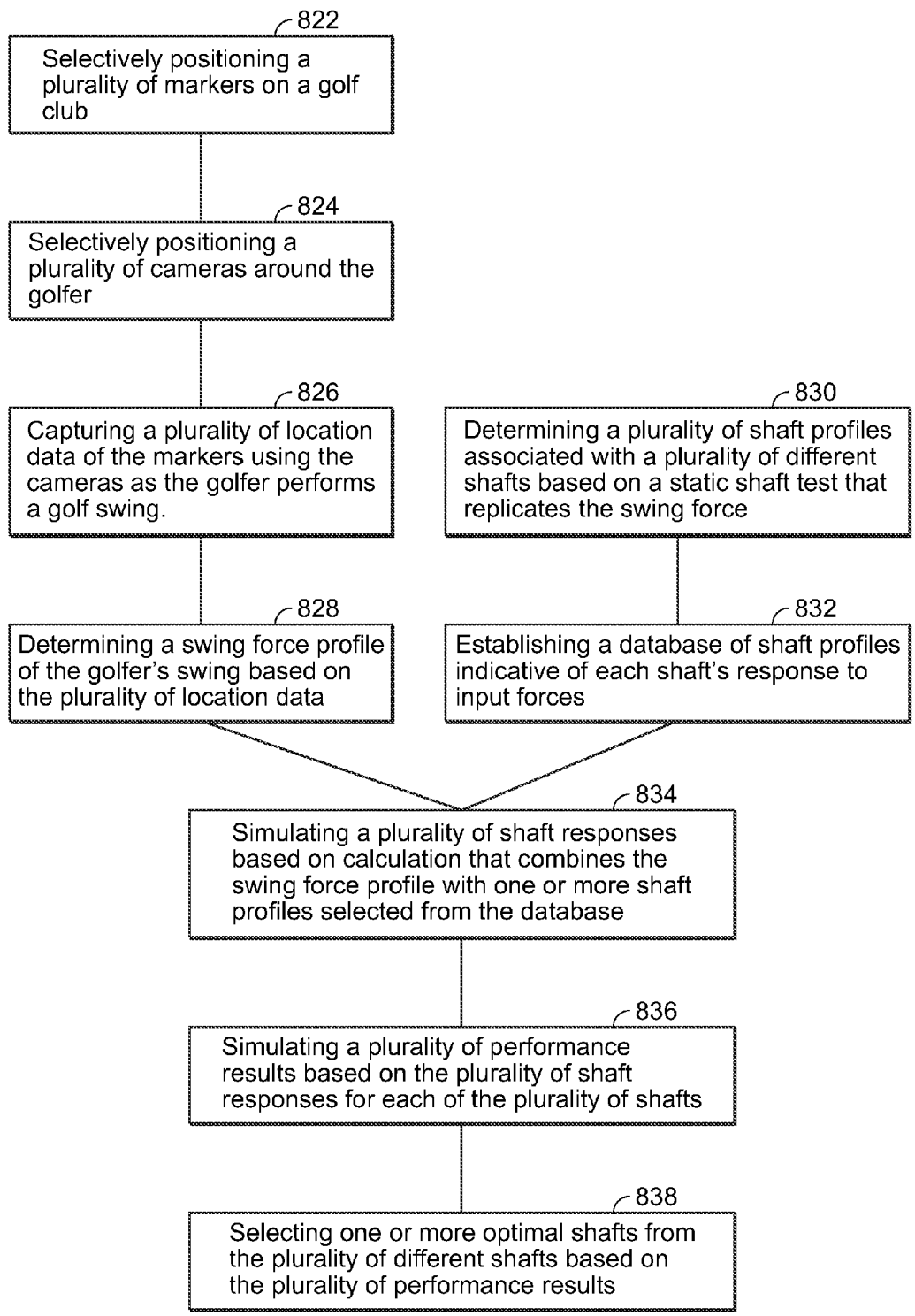
FIG. 8b shows a different flow chart of a different fitting methodology in accordance with an alternative embodiment of the present invention.

FIG. 8b shows an alternative methodology in accordance with a further alternative embodiment of the present invention. More specifically, this alternative methodology utilizes the force profiles generated by the golfer together with measured shaft profiles that are subjected to a simulation of similar forces to predict performance results. This alternative embodiment differs from the previous embodiment in that it performs a static shaft test in step 830 that emulates the forces that a golfer exerts on the shaft, allowing the model to predict how the golf club head will be delivered to the ball as the specific golfer's forces are applied to each individual shaft.

Figure 8C:
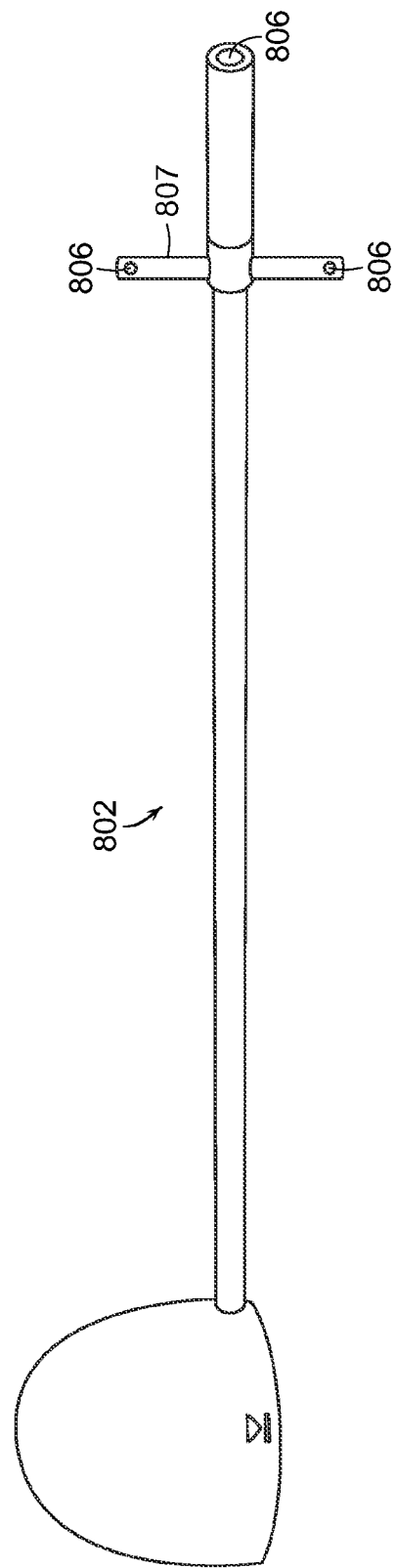
FIG. 8c shows a perspective view of a golf club including a plurality of retroreflective sensors near a grip end of the golf club in accordance with an alternative embodiment of the present invention.

In step 822, the positioning of the plurality of markers on the golf club may generally be focused on the grip end of the club for this embodiment, as the focus of the data capturing in this embodiment is biased towards capturing the input of the golfer, however, it should be noted that information from the club head could be gathered as well without departing from the scope and content of the present invention. FIG. 8c of the accompanying drawings shows a perspective view of a marker set up in accordance with this exemplary embodiment of the present invention. More specifically, FIG. 8c shows a golf club 802 having a plurality of markers 806 only at the grip end of the golf club 802. In order to establish the requirements to triangulate and locate the position of the markers, a set of three markers are provided here. One marker 806 is located at the butt end of the grip while the other two markers 806 are located at the terminal end of the grip. It should be noted that in this exemplary embodiment of the present invention, the markers 806 at the terminal end of the trip are placed along a lengthy extension 807 away from the grip and shaft. This extension 807 allows two of the markers 806 to be placed away from the axis of rotation of the shaft, allowing more accurate measurements while eliminating some measurement noise that could exist in the data.

Returning now to FIG. 8b, steps 824 and 826 have already been described above, and don't differ much from prior data capturing methodologies. However, the next couple of steps differ from the previously mentioned methodologies. More specifically, in step 828, a swing force profile for a golfer is determined based on the information captured in step 826. Step 828 differs from step 829 in that the current embodiment calculates the force exerted by the golfer based on the location data gathered in step 826 instead of trying to create a digital swing model of the golfer's swing via a computer processor.

The force exerted by the golfer at the grip end of the golf club creates a swing force profile, which includes a combination of the centrifugal force and the deflection exerted by the golfer. In order to illustrate the force profile of the centrifugal force and deflection force exerted by the golfer, FIG. 8d is provided.

Figure 8D:
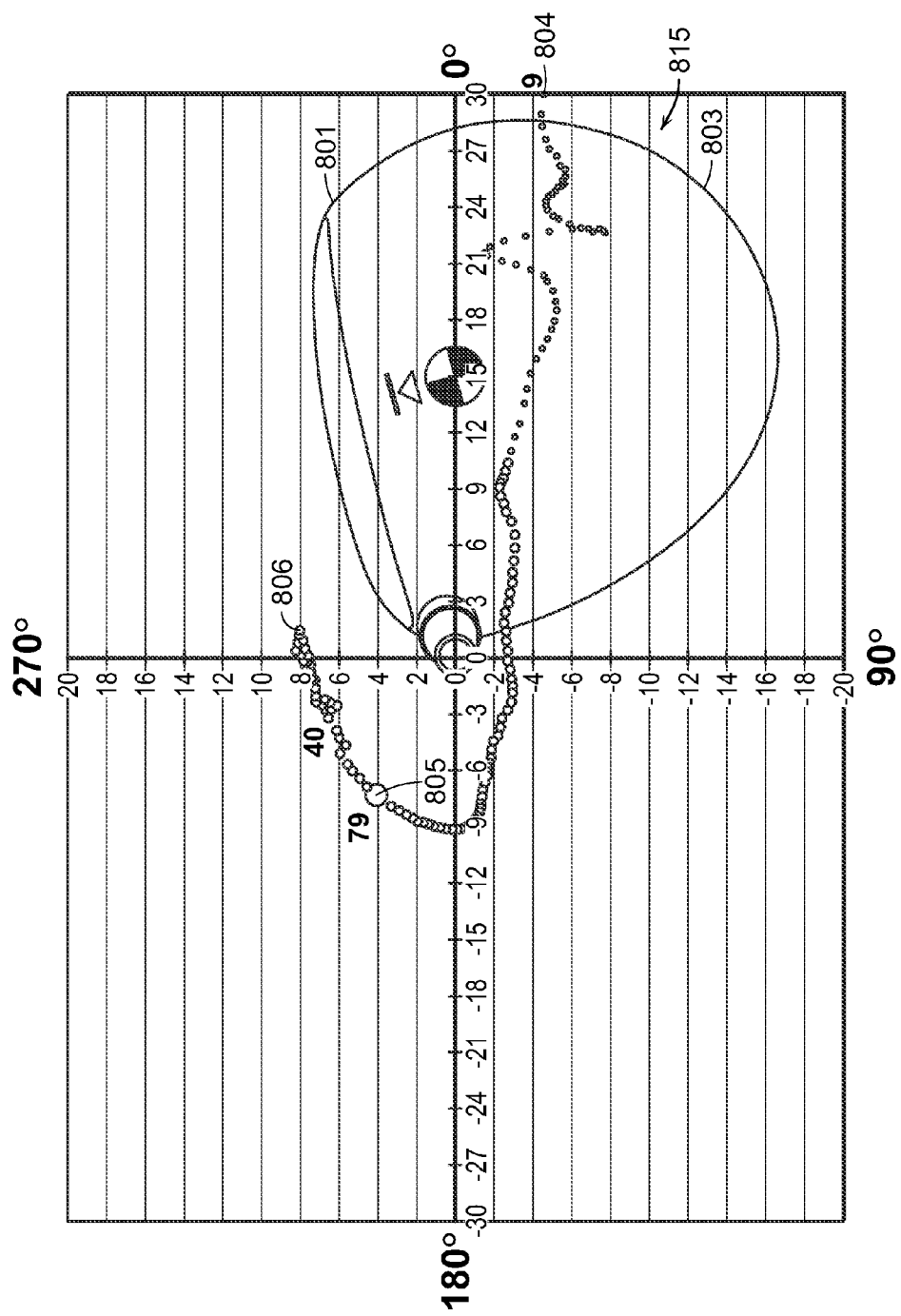
FIG. 8d shows a directional force diagram of a golfer's input swing force profile in accordance with an exemplary embodiment of the present invention.

FIG. 8d of the accompanying drawings shows a graphical representation of the force profile exerted by the golfer on the CG 801 of the golf club head 815 throughout a golfer's downswing and his follow through, with each single data point 803 representative of the direction and magnitude of the force. More specifically, FIG. 8d shows the magnitude of the force along with the direction of the force relative to the central axis. The golfer's downswing begins at data point 804 where the golfer exerts 9 lbs. of force in a direction that is approximately 30 degrees in one direction and approximately −5.0 degrees in another direction. At the impact location identified by data point 805, the golfer is exerting 79 lbs. of force in a direction that is approximately −8 degrees in one direction and approximately 4 degrees in another direction. Finally, at the termination of the swing signified by data point 806 the golfer is exerting 40 lbs. of force in a direction that is approximately 1 degree in one direction and approximately 8 degrees in another direction.

Once the golfer's input force profile has been calculated and determined in step 828, a separate and additional step 830 is required to determine a plurality of shaft profiles associated one or more shafts via a static shaft test that creates a continuous shaft response model. In order to explain the static shaft test used in step 830, FIGS. 16a-c and 17a-d are provided in the accompanying drawings showing more features of the static shaft testing apparatus.

Figure 16A:
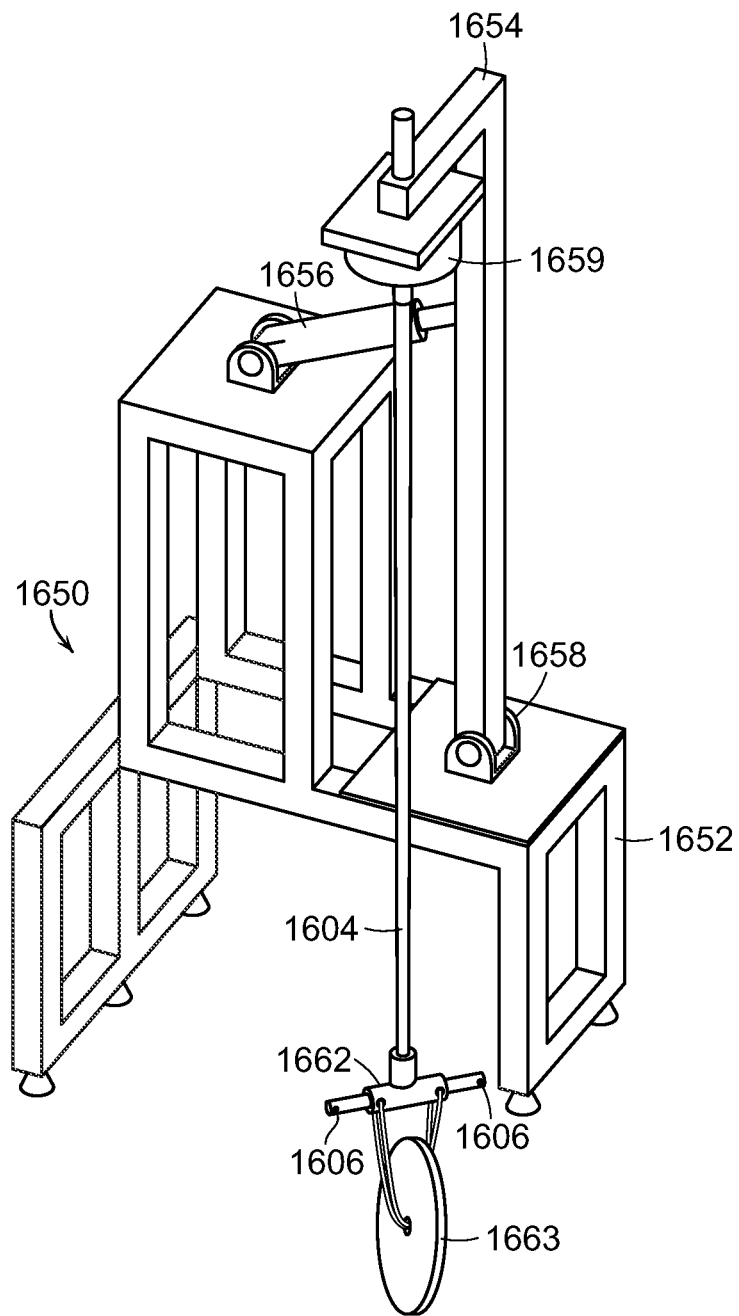
FIG. 16a shows a perspective view of a static shaft testing apparatus in accordance with an exemplary embodiment of the present invention.

FIG. 16a shows a perspective view of a static shaft testing apparatus 1650 in accordance with an exemplary embodiment of the present invention. More specifically, the shaft testing apparatus 1650 includes a base 1652, a cantilever beam 1654, and an angle adjustment device 1656 that attaches to the cantilever beam 1654 to tilt the cantilever beam 1654 on a hinge 1658. The angle adjustment device 1656, as referred to in this current exemplary embodiment of the present invention may generally be an actuator; however different devices such as an electrical motor, a pneumatic pump, a hydraulic pump, or even a piezoelectric actuator may be used all without departing from the scope and content of the present invention so long as it is capable of adjusting the angle of the cantilever beam 1654. The cantilever beam contains a clamp 1659 that clamps around the grip end of a golf club shaft 1604 to secure the entire shaft 1604 while it is subjected to mass 1663 at the tip end of the shaft 1604 to simulate one possible instant of a force profile that a golfer exerts onto the golf club shaft 1604 during a golf swing. In this exemplary embodiment, the mass 1663 is attached to the shaft 1604 via a balanced weight hook 1662 to simulate an axial element of the force experienced by the shaft during a golf swing. The balanced weight hook 1662 may generally have a plurality of extensions allowing sensors 1606 to be attached at the tip end of the shaft 1604. These sensors allow the motion capture cameras to record the reaction of the shaft 1604 as it is subjected to different forces.

Figure 16B:
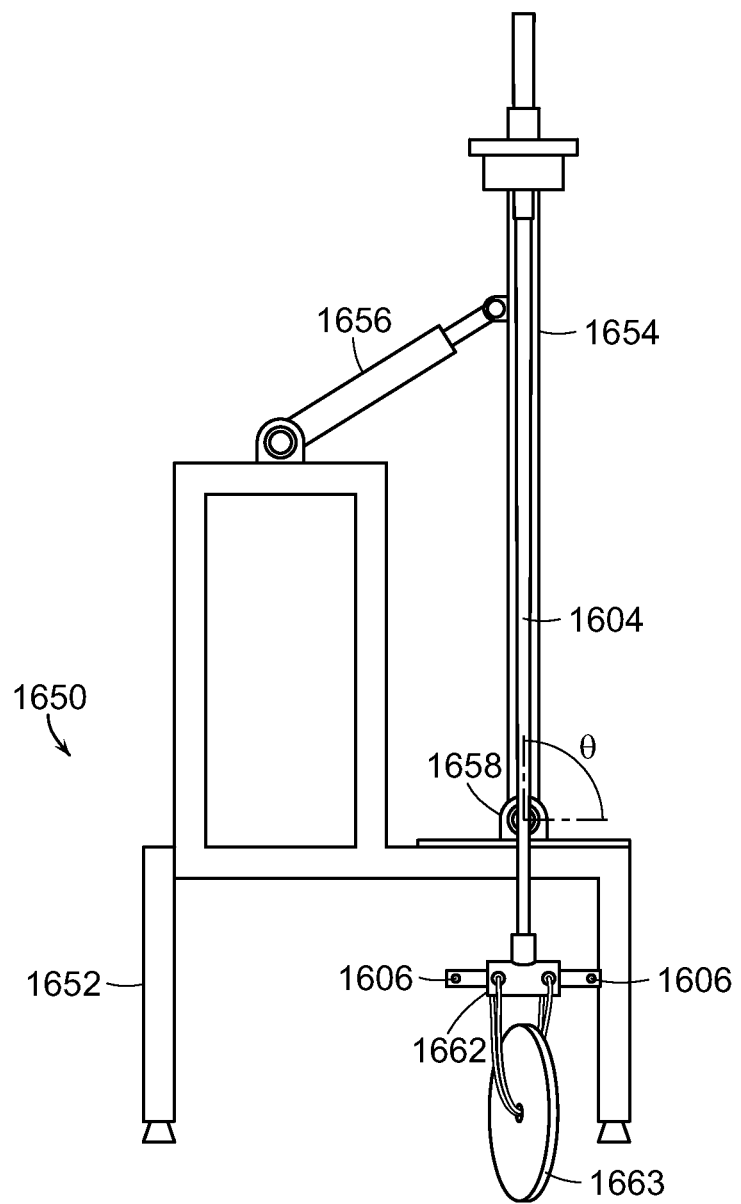
FIG. 16b shows a frontal view of the static shaft testing apparatus in accordance with the exemplary embodiment of the present invention.
Figure 16C:
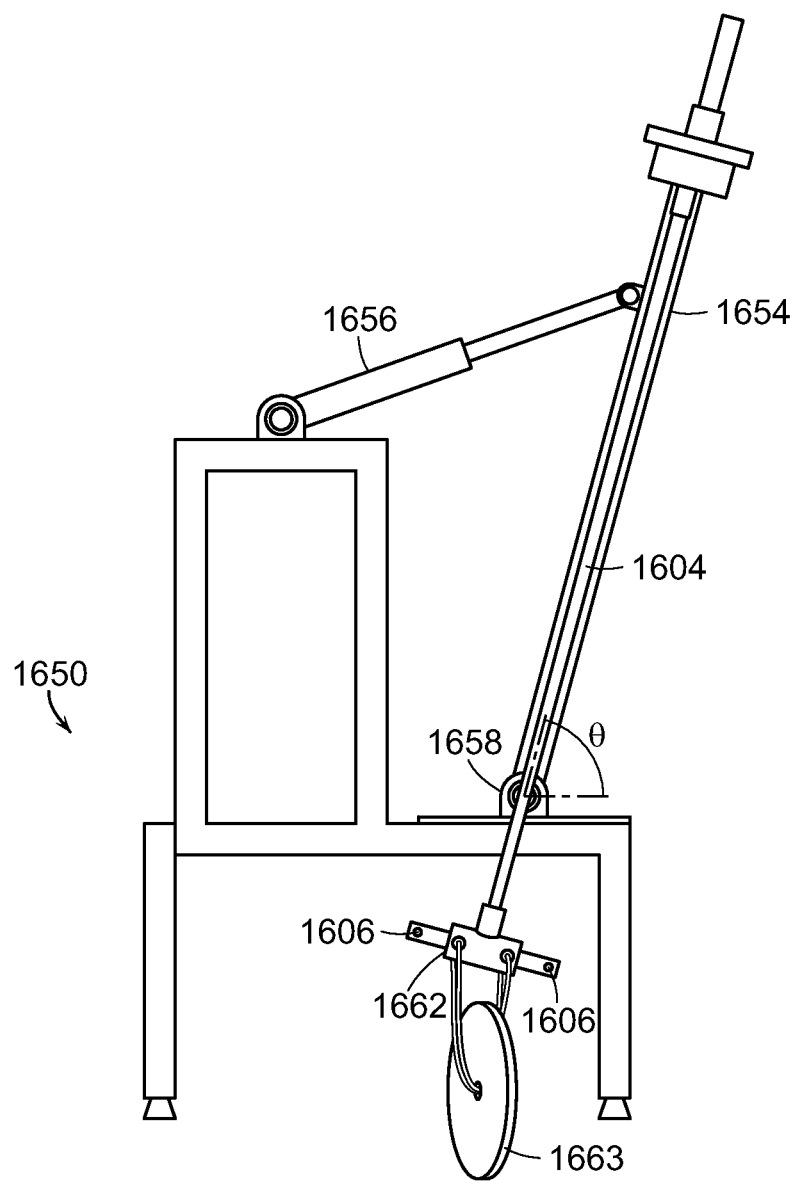
FIG. 16c shows a frontal view of the static shaft testing apparatus being tilted at an angle in accordance with an exemplary embodiment of the present invention.

FIG. 16b provides a frontal view of the static shaft testing apparatus 1650 at an upright position with θ of approximately 90 degrees. In this particular setup, the shaft testing apparatus 1650 can be used to simulate the type of force exerted on the shaft that appears in an axial direction. The amount of weight 1663 added to the balanced weight hook 1662 will generally mimic the force associated with a golfer's golf swing. In the current exemplary embodiment, five different sets of weights 1663 ranging from 20 lbs., 40 lbs., 60 lbs., 80 lbs., and 100 lbs.

are attached to the balanced weight hook 1662 to recreate the different forces generated by the golfer. FIG. 16c provides a frontal view of the static shaft testing apparatus at a tilted angle of θ that increases incrementally to simulate the different forces experienced by the shaft at different angles. More specifically, different amount of weights 1663 ranging from 20 lbs., 40 lbs., 60 lbs., 80 lbs., and 100 lbs. will be tested at different tilt angles θ of 87°, 84°, 81°, 78°, and 75° to simulate an entire incremental range of forces that could be experienced by the shaft during a golf swing. During each one of those static tests, the position and locations of the markers 1606 at the extremities of the balanced weight hook 1662 are recorded, establishing a relationship between an input force and a response of the shaft 1604.

Figure 17A:
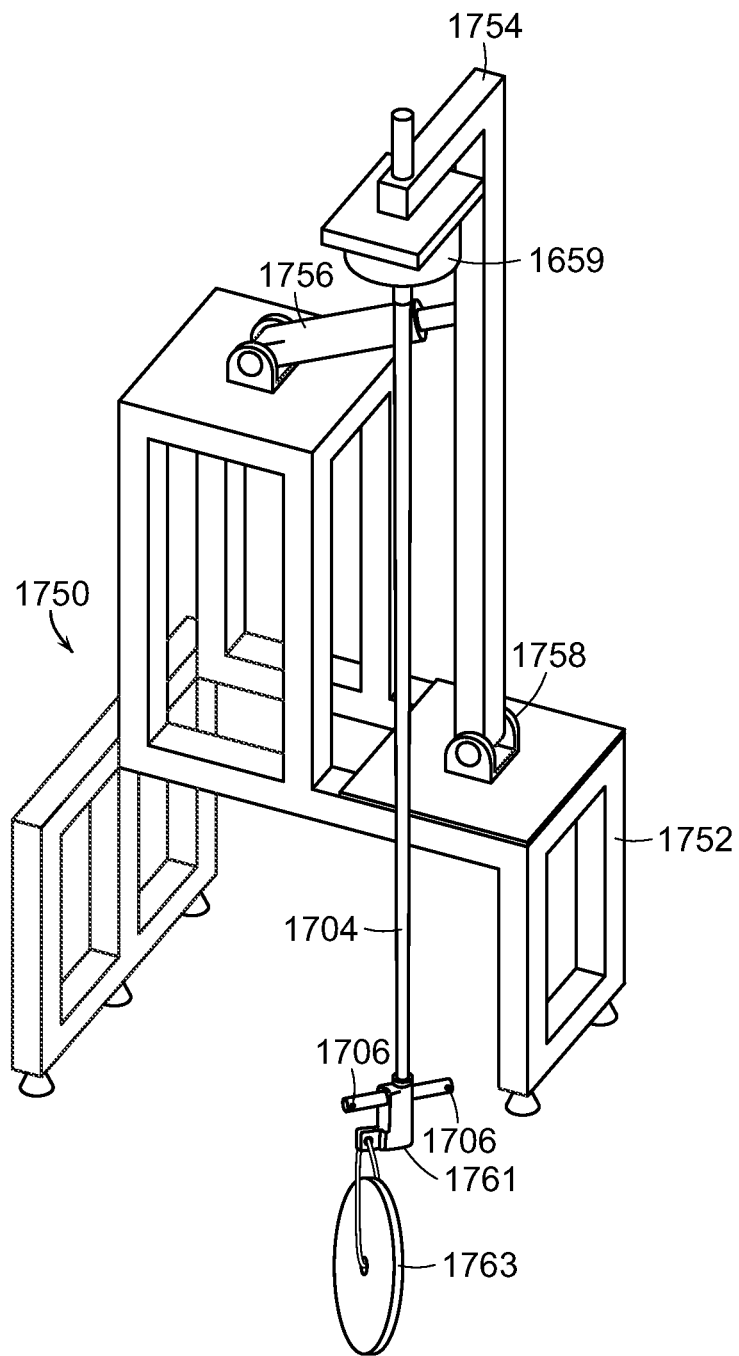
FIG. 17a shows a perspective view of a static shaft testing apparatus in accordance with an exemplary embodiment of the present invention.

FIG. 17a shows a perspective view of a static shaft testing apparatus 1750 in accordance with an exemplary embodiment of the present invention. This static shaft testing apparatus 1750 utilizes the same components as the static testing apparatus 1650 shown in FIG. 16a, but incorporates a CG replicating hook 1761 instead of a balanced weight hook 1662. The CG replicating hook 1761 replicates the CG location of a golf club head, allowing weight to be added to the shaft 1704 at the exact location of the CG of a golf club head. The CG replicating hook 1761 allows the static shaft testing apparatus 1750 to replicate the forces experienced by the shaft relative to the CG location of the golf club head throughout a golf swing.

Figure 17B:
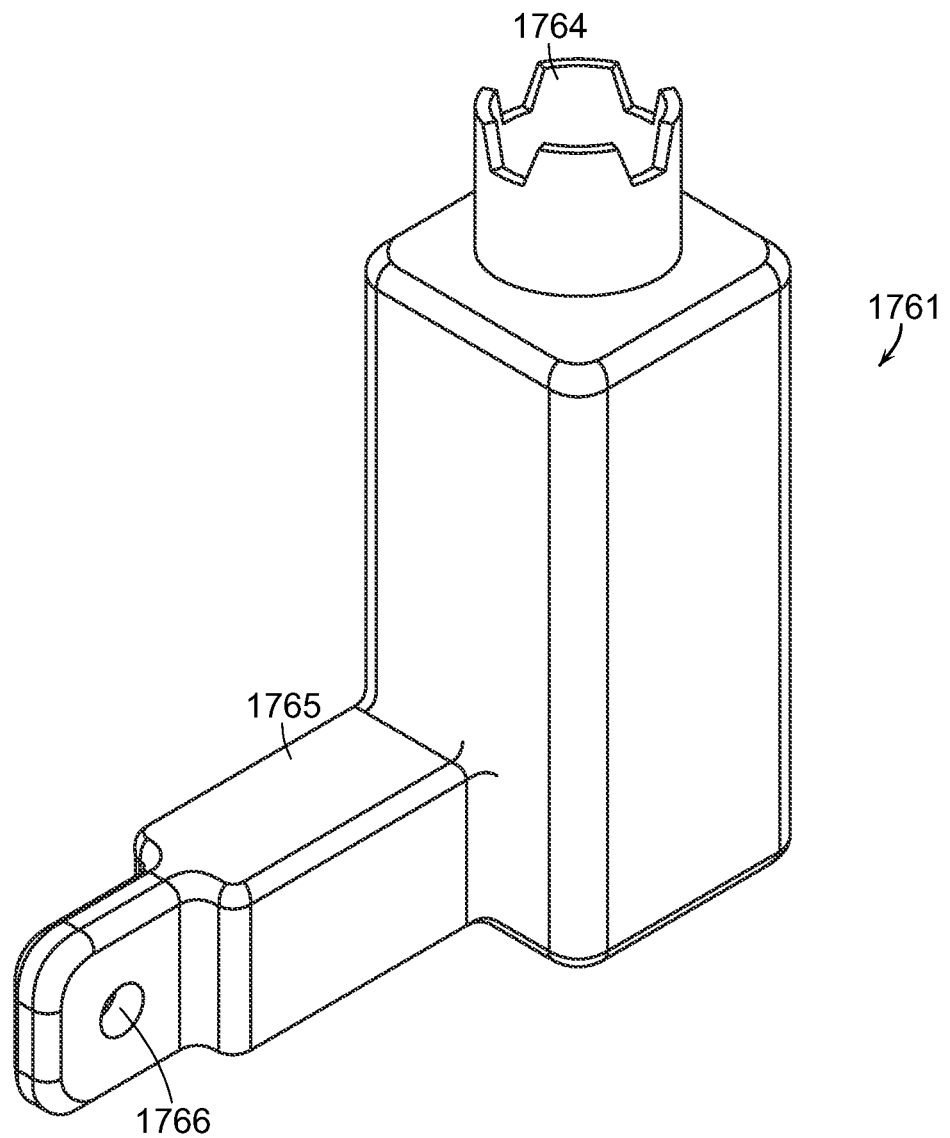
FIG. 17b shows a perspective view of a CG replicating hook in accordance with an exemplary embodiment of the present invention.

To illustrate the CG replicating hook 1761 in more detail, FIG. 17b is provided here with a perspective view of the CG replicating hook 1761 in accordance with an exemplary embodiment of the present invention. The CG replicating hook 1761 may generally be constructed out of a lightweight metallic material having a connector 1764 that connects to the tip end of a shaft 1704. At the opposite end of the connector 1764, an extension leg 1765 is provided to allow the hanging loop 1766 to be at a location that coincides with the actual CG location of a particular model of golf club head. It should be noted that every potential golf club head could have a slightly different CG location, hence in order to provide an accurate database of how different shafts reacts in combination with different club heads, multiple CG replicating hooks 1761 may be created.

Figure 17C:
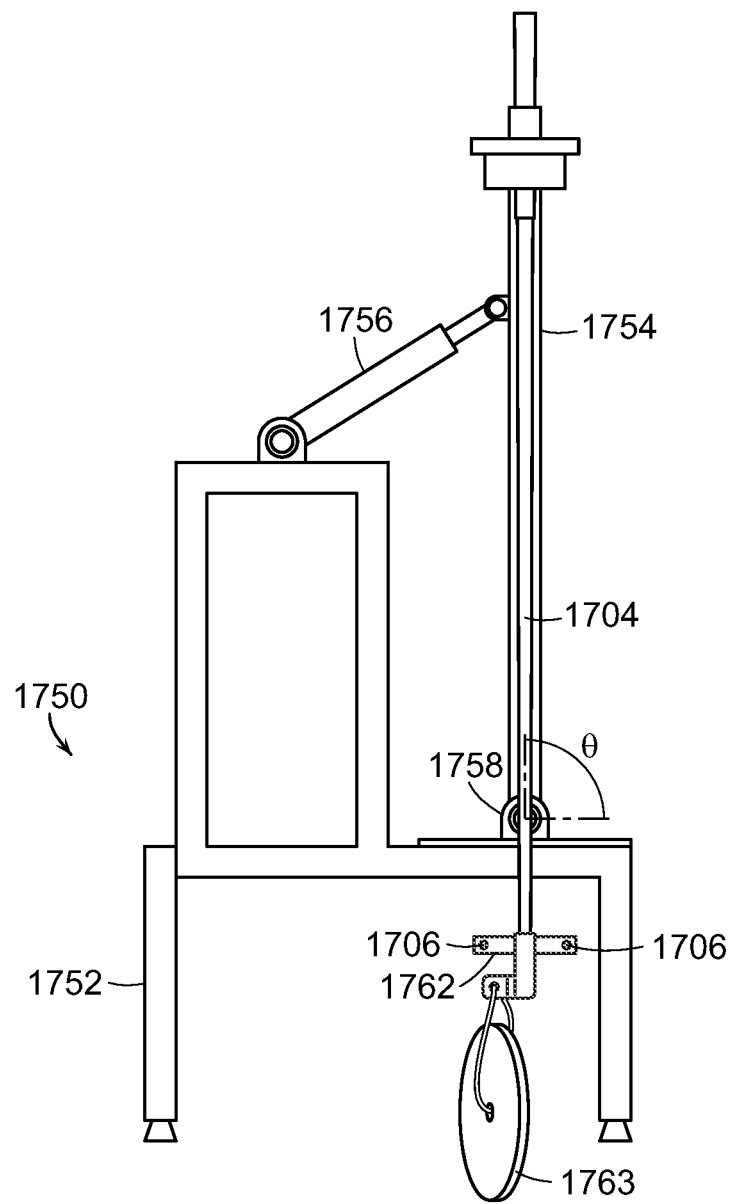
FIG. 17c shows a frontal view of the static shaft testing apparatus in accordance with the exemplary embodiment of the present invention.
Figure 17D:
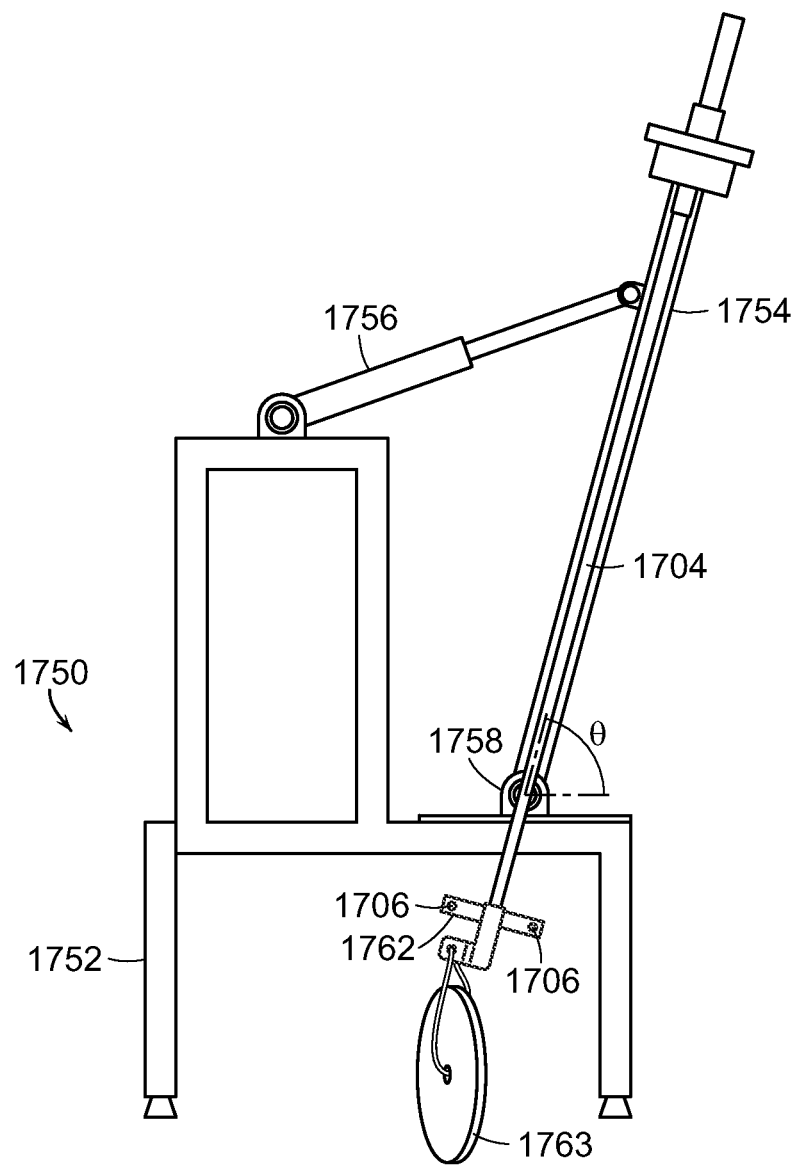
FIG. 17d shows a frontal view of the static shaft testing apparatus being tilted at an angle in accordance with an exemplary embodiment of the present invention.

FIGS. 17c and 17d illustrates prospective views of the test conducted in FIGS. 16b and 16b, but with a CG replicating hook 1761 instead. More specifically, different amount of weights 1763 ranging from 20 lbs., 40 lbs., 60 lbs., 80 lbs., and 100 lbs., will be tested at different tilt angles θ of 87°, 84°, 81°, 78°, and 75° to simulate an entire incremental range of forces that could be experienced by the shaft during a golf swing. However, it should be noted that in this particular test, the CG replicating hook 1761 will simulate a torque element and a CG offset element of the forces experienced by the shaft during a golf swing in addition to the axial element measured above by the balanced weight hook 1662.

Figure 8E:
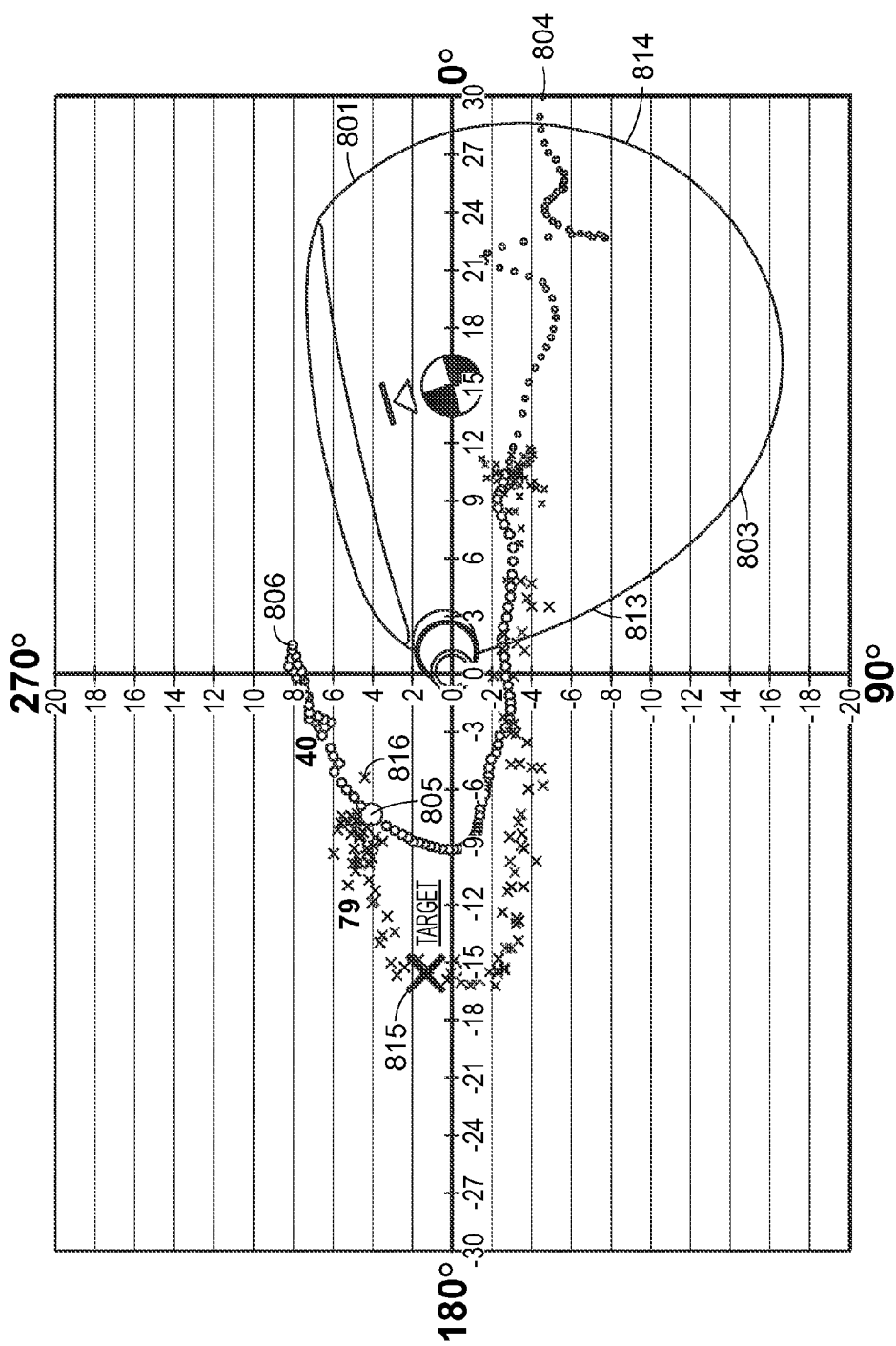
FIG. 8e shows a directional force diagram containing both a golfer's input swing force profile as well as the output shaft response forces in accordance with an exemplary embodiment of the present invention.

Returning to FIG. 8b once the static shaft test is performed for each and every single test that is desired in step 832, a database of shaft profiles is created, wherein the shaft profiles are indicative of each shaft's response to the input forces. The database can then be combined with the golfer's swing force profile to create plurality shaft responses in step 834. The plurality of shaft responses, as it can be seen from step 834, is a combination of the forces gathered from the golfer's swing profile and the reaction of each and every single shaft as it responded to those simulated forces via the static shaft test in step 832. The combination of the golfer's input swing force profile and the shaft response to that input can be seen in more detail in FIG. 8e. FIG. 8e looks very similar to FIG. 8d, but adds an additional set of data that represent the ultimate shaft response in terms of the force at the tip end of the shaft. More specifically, the shaft responses are symbolized by the "x" datapoints 813 with the beginning of the downswing being at datapoint 814, the impact occurring at datapoint 815, and the swing terminating at datapoint 816. This shaft response may generally comprises of several elements, including but not limited to a shaft tip outward angle, a shaft tip downward angle, a torque angle, and an amount of deflection.

Armed with the shaft responses and the resulting forces from datapoints 803 in FIG. 8e, a plurality of performance results data can be calculated in step 836. Once the plurality of performance result data is calculated in step 836, one or more optimal shafts can be selected from the plurality of different shafts in step 838. The selection of one or more optimal shafts can be based off performance results such as a launch angle, a descent angle, a spin rate, an attack angle, a club path, a carry distance, a total distance, and a dispersion distance.

In a preferred example of the present invention, a plurality of shafts can be created having different weights, but similar static shaft responses to create a shaft family. For example, a 40 gram, 50 gram, 60 gram, 70 gram and 80 gram shaft can be created such that they have substantially similar deflections and torque values when tested as set forth above. For example, a first family of shafts may have a deflection of about 27 mm under an 80 lb. load and a second family may have a deflection of about 30 mm under an 80 lb. load. Thus, based on the shaft responses to the golfer's resulting forces, a proper family of shafts can be identified. Then the proper weight shaft can be selected from the family.

In another preferred example of the present invention, a plurality of shafts having lengths to create club lengths from 43 inches to 48 inches by ½ inch increments can be formed to have similar static shaft responses to form a shaft family. In this family, for example, the longer shaft will be stiffer, that is provide more resistance to deflection, than a shorter shaft in the family. Thus, each of the shafts can provide similar shaft responses for a golfer. A plurality of families can be created having different static shaft responses such that the proper family can be identified from the shaft responses to the golfer's resulting forces. Then the proper length shaft can be selected from the preferred shaft family.

Figure 9:
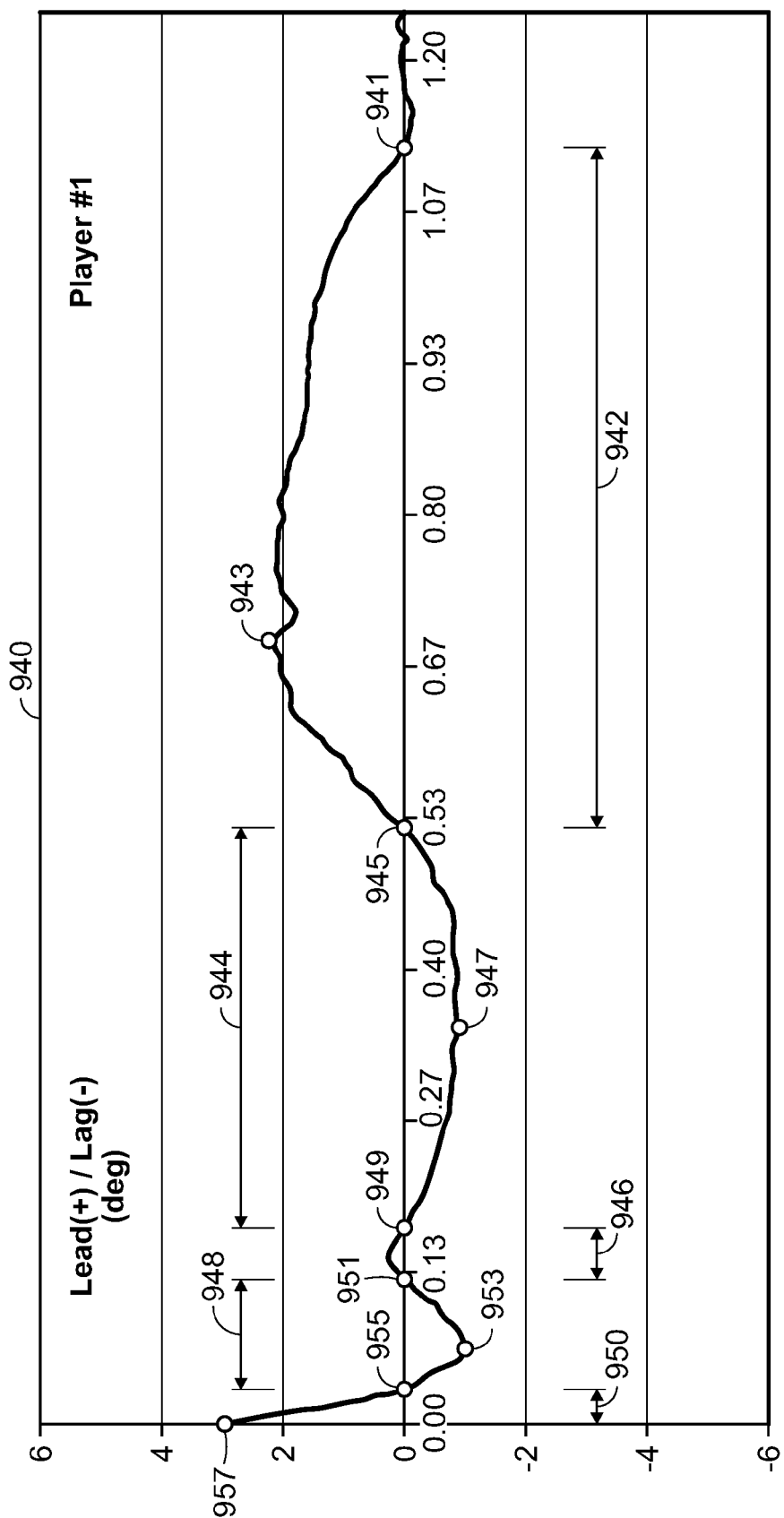
FIG. 9 shows a lead/lag behavioral plot of a golf club as it is being swung by Player #1 in accordance with an exemplary embodiment of the present invention.

FIG. 9 of the accompanying drawings shows a graphical representation of the lead/lag as measured by the angular difference between the butt end portion of the golf club and the tip end portion of the golf club. More specifically, FIG. 9 of the accompanying drawings is directed at one particular swing of a specific golfer; and as the later figures will show, different golfers will have completely different golf swingprints leading to the need for different shafts for different golfers. The lead/lag plot 940 shown in FIG. 9 may contain many components, which may correspond to several of the dynamic behavioral characteristics discussed above. Alternatively speaking, it can also be said that the dynamic behavioral characteristics that are calculated based on the plurality of location data can often be extrapolated, at least partially, from the lead/lag plot 940 shown in FIG. 9. Before diving into the various components of this lead/lag plot 940, it is worthwhile to explain that the x-axis in this current lead/lag plot 940 may generally refer to the duration of the golfer's swing, counting backwards from the impact 957 at the left end of the chart; while the y-axis in this current lead/lag plot 940 may generally refer to degrees of variation between the plurality of sensors at the tip end of the golf club and the butt end of the golf club in a lead/lag direction.

Moving onto the substantive content of the lead/lag plot 940, it can be seen that the plot tracks the lead and lag variations in the golf club throughout this particular golfer's (Player #1) golf swing. Anything in the positive y-axis portion of this graph represents the tip end of the golf club leading the butt end of the golf club; alternatively, anything in the negative y-portion of this graph represents the tip end of the golf club head lagging behind the butt end of the golf club. Initially, Player #1 initiates his swing at start of swing 941, which initiates the takeaway lead period 942; during which the tip of the golf club follows the hands of the golfers, creating a lead. What follows the takeaway lead period 942 is generally the takeaway lag period 944, during which the shaft recovers from the momentum of the backswing and oscillates to transition lead period 946 for a little bit before entering the downswing lag period 948. At the tail end of the golf swing near the impact 959 point is the final phase of downswing lead period 950 during which the golf club shaft snaps and kicks from the lag built up in the downswing to provide additional velocity onto the golf ball at impact.

Mixed in with all the periods of interest are several additional important dynamic behavioral characteristics that convey more information about the specific golfer's golf swing. For example, the takeaway lead period 942 may contain the takeaway max lead 943, beginning with the start of swing 941 and ending with the takeaway recovery point 945. The takeaway recovery point 945, as shown in FIG. 9 may generally refer to the location of the swing where Player #1 begins slowing down his golf swing allowing the tip end of the golf club to catch up with the butt end of the golf club. Similar to above, the takeaway lag period 944 may contain the takeaway max lag 947 and ends with the downswing recovery point 949. The transition lead period 946, although having a lead peak, is relatively small, and is not specifically highlighted in this specific figure. Somewhere within the transition lead zone 946, the golfer begins his downswing and enters into the downswing neutral point 951 to begin the downswing lag period 948 that contains the downswing max lag 953. Finally, towards the finally of the golf swing, the golf club transitions into the downswing lead period 950 through the downswing recovery point 955 and finishing with the downswing max lead 957. It is worthwhile to note here that the maximum amount of lead that the golf club experiences is at the impact point 957, which is indicative of the golf club whipping and snapping at the point of impact to provide the golfer with additional clubhead speed.

Figure 10:
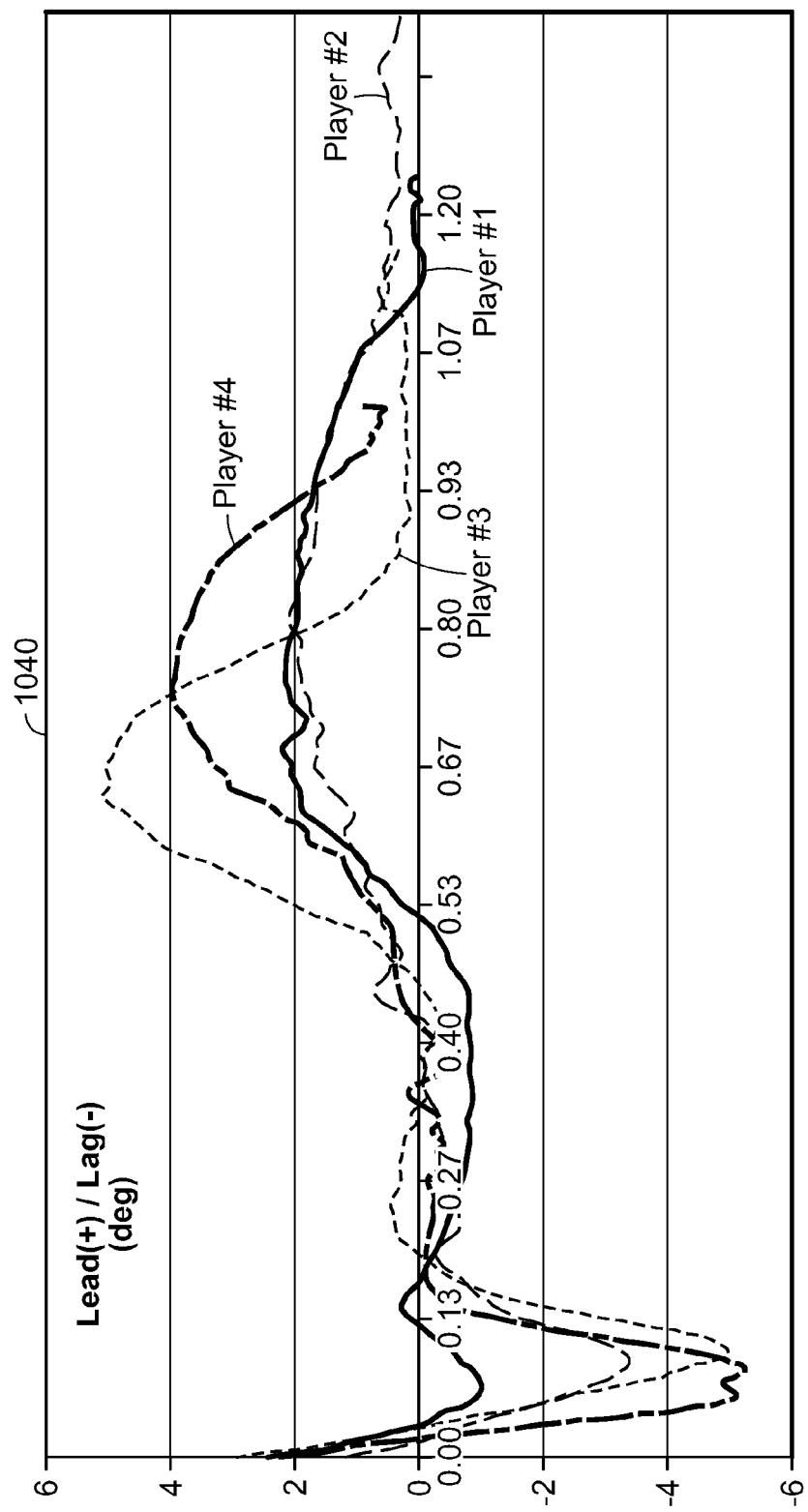
FIG. 10 shows multiple lead/lag behavioral plots of a golf club as it is being swung by Player #1, Player #2, Player #3, and Player #4 in accordance with an exemplary embodiment of the present invention.

Needless to say, Player #1's swing-map shown in FIG. 9 is only indicative of one particular swing of one particular golfer. Different golfers may experience different swing-prints that could differ significantly than what is shown in FIG. 9. However, despite all the unique characteristics in individual golfer's swing-print, many of the above references dynamic behavioral characteristic can all be found in different swings shown in FIG. 10. More specifically, FIG. 10 of the accompanying drawings show the graphical depiction of the lead/lag plots 1040 of multiple different golfers to show their different swing-prints; all the while having very distinct and identifiable dynamic behavioral characteristics mentioned above. The lead/lag plot 1040 has the swing-print of Player #1 shown in FIG. 9 as well as Player #2, Player #3, and Player #4. The dramatic difference in the swing-print of these four different PGA Tour level players is an indication that regardless of the skill level, the unique characteristics in golfer's swing-print will require a golf club shaft that performs differently to maximize the performance of each golfer's golf swing.

In a preferred embodiment, a shaft family from a plurality of shaft families could be selected to best fit the swing-print for each of these golfer's and then the shaft having the preferred mechanical shaft characteristics can be recommended.

Figure 11:
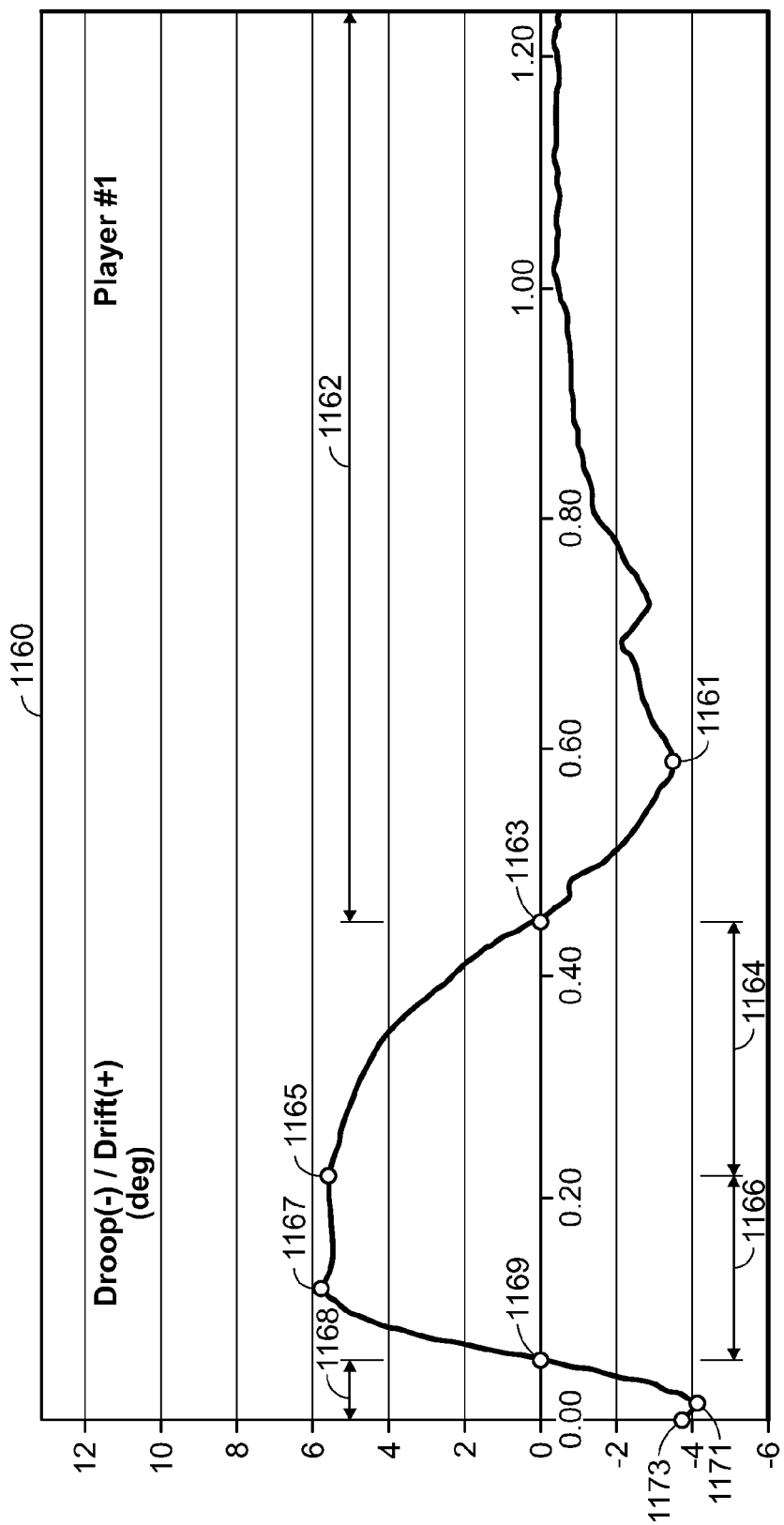
FIG. 11 shows a droop/drift behavioral plot of a golf club as it is being swung by Player #1 in accordance with an exemplary embodiment of the present invention.

FIG. 11 of the accompanying drawings shows a graphical representation of the droop/drift angle between the butt end portion of the golf club and the tip end portion of the golf club. Similar to the lead/lag plot 940 shown in FIG. 9, FIG. 11 contains a significant amount of data that correspond to the one or more dynamic behavioral characteristics used to determine the recommended shaft for a golfer. The x-axis of the current droop/drift plot 1160 also refers to the timing of the golfer's swing, counting backwards from the impact 1173 point at the left end of the chart; while the y-axis refers to degrees of variation between the plurality of sensors at the tip end of the golf club and the butt end of the golf club in a droop/drift orientation. Positive y values in FIG. 11 indicates droop, wherein the tip end of the club falls lower than the butt end of the club; while negative y values in FIG. 11 indicate drift, wherein the tip end of the club rises higher than the butt end of the club.

The droop/drift plot 1160 shown in FIG. 11 of the accompanying drawings depicts the droop and drift tendencies of the exact same swing of Player #1 illustrated in FIG. 9. The droop drift plot 1160 may comprise a takeaway droop period 1162 during which the tip end of the golf club droops relative to the butt end of the golf club. The takeaway drift period 1164 immediately follows the takeaway droop period 1162. The downswing drift period 1166 follows the takeaway drift period 1164, the separation occurring at the transition point in the swing. Finally, the swing finishes in the downswing droop period 1168, during which the club ends at the impact point 1173. Similar to above, there are additional dynamic behavioral characteristics shown in FIG. 11 including the takeaway max droop 1161, the takeaway droop recovery 1163, the takeaway max drift 1165, the downswing max drift 1167, downswing drift recovery 1169, downswing max droop 1171, and impact 1173.

Figure 12:
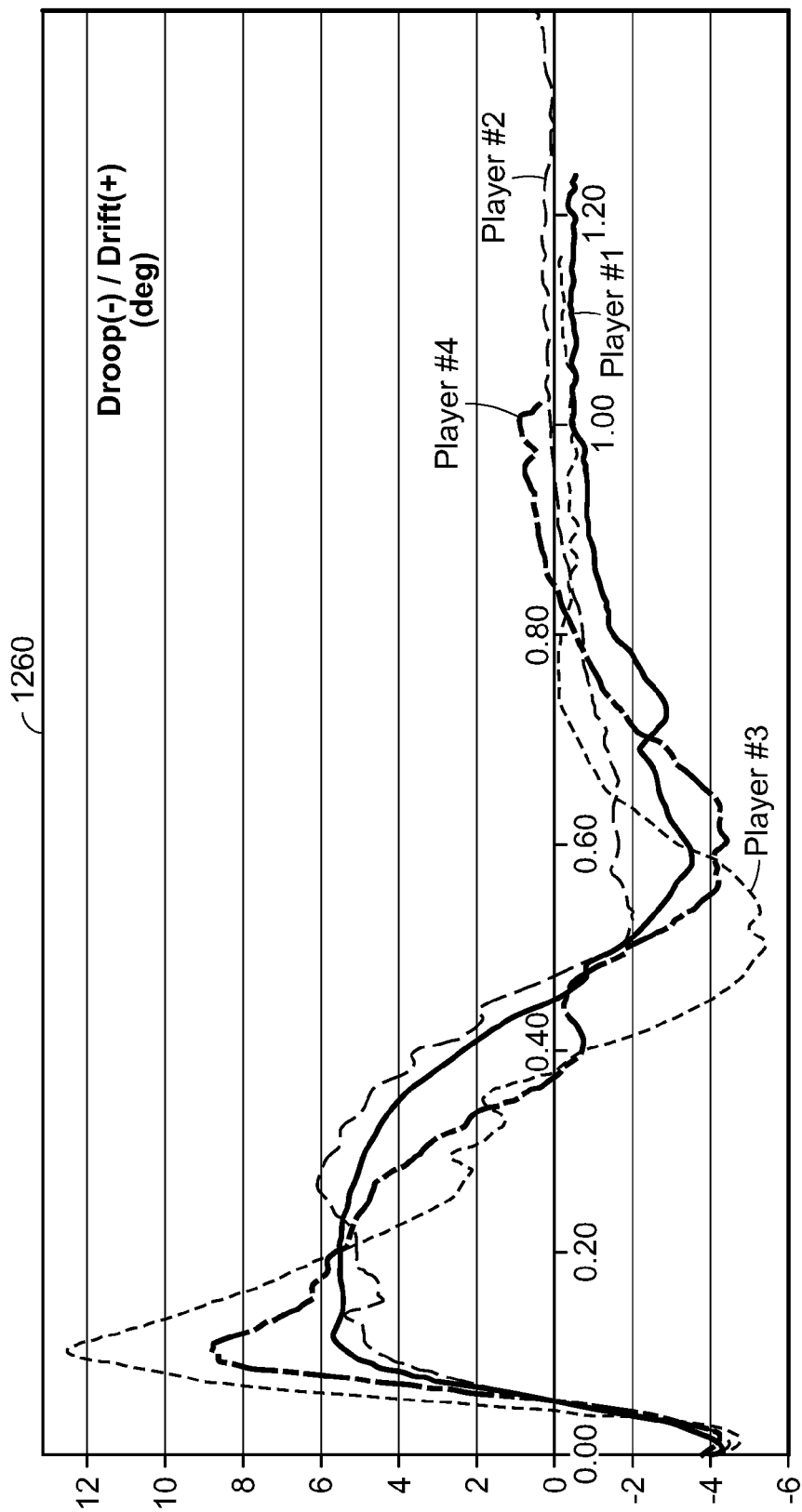
FIG. 12 shows multiple droop/drift behavioral plots of a golf club as it is being swung by Player #1, Player #2, Player #3, and Player #4 in accordance with an exemplary embodiment of the present invention.

Similar to the lead/lag, FIG. 12 shows that different golfers having different swing-prints could yield in dramatically different results in their droop/drift plots 1260. More specifically, FIG. 12 shows the difference in droop/drift characteristics of Player #1, Player #2, Player #3, and Player #4 in order to illustrate the difference in the droop/drift swing-print amongst the different players.

Figure 13:
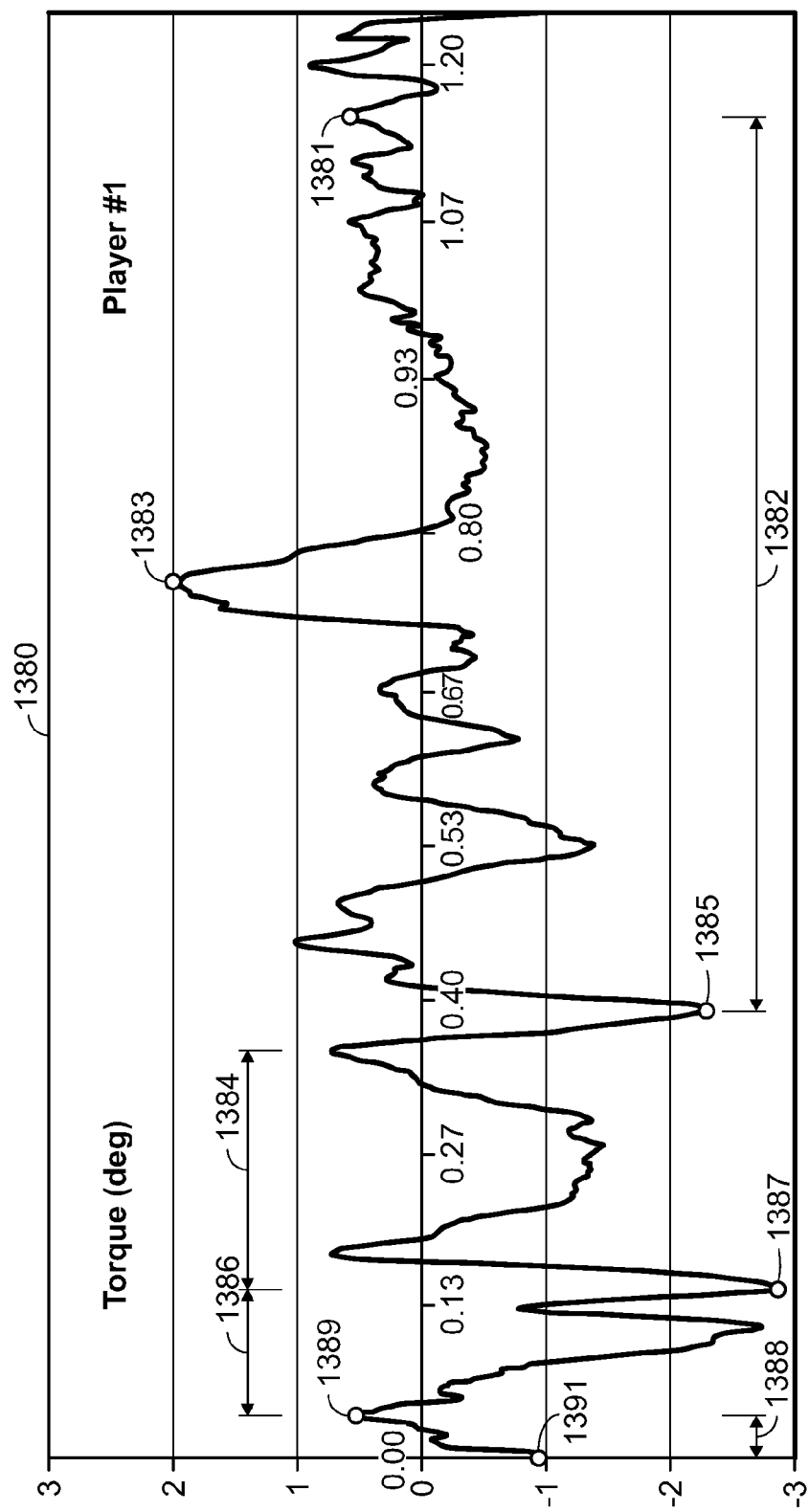
FIG. 13 shows a torque behavioral plot of a golf club as it is being swung by Player #1 in accordance with an exemplary embodiment of the present invention.

FIG. 13 of the accompanying drawings shows a graphical representation of the torque changes between the butt end of the golf club and the tip end of the golf club. Similar to the lead lag plot 940 and the droop drift plot 1160 shown in FIGS. 9 and 10, the current torque plot contains data that correspond to one or more dynamic behavioral characteristics that can be used to determine the recommended shaft for a golfer. The x-axis of the current torque plot 1360 refers to the time duration of the golfer's golf swing, counting backwards from the impact 1391 point at the left end of the chart; while the y-axis refers to the degree of twist the golf club experiences between the plurality of sensors at the tip end of the golf club and the plurality of sensors at the butt end of the golf club. Positive y values in FIG. 13 show a positive torque in the clockwise direction when looking down a shaft, causing the clubhead to turn open relative to the butt end; while negative y values in FIG. 13 show a negative torque in a counter clockwise direction when looking down at a shaft, causing the clubhead to turn closed relative to the butt end.

Initially, based on the dramatic variations in the data, it can be seen that the torque data plots contain a significant amount of noise that could skew the data presented. This amount of noise can be attributed to the short distance encompassed by the plurality of markers that circularly wrap around the circumference of the shaft, amplifying minor vibrations. Despite the amount of noise, the torque plot 1380 shown in FIG. 13 can still be deciphered, using our basic understanding and timing of the golf swing. Torque plot 1380 may comprise a takeaway negative torque period 1382, a takeaway positive torque period 1384, a downswing negative torque period 1386, and a downswing positive torque period 1388. Within each of the identified period includes specific points of interests such as start of swing 1381, takeaway max positive torque 1383, takeaway max negative torque 1385, downswing max positive torque 1389, downswing max negative torque 1387, and impact 1391.

Figure 14:
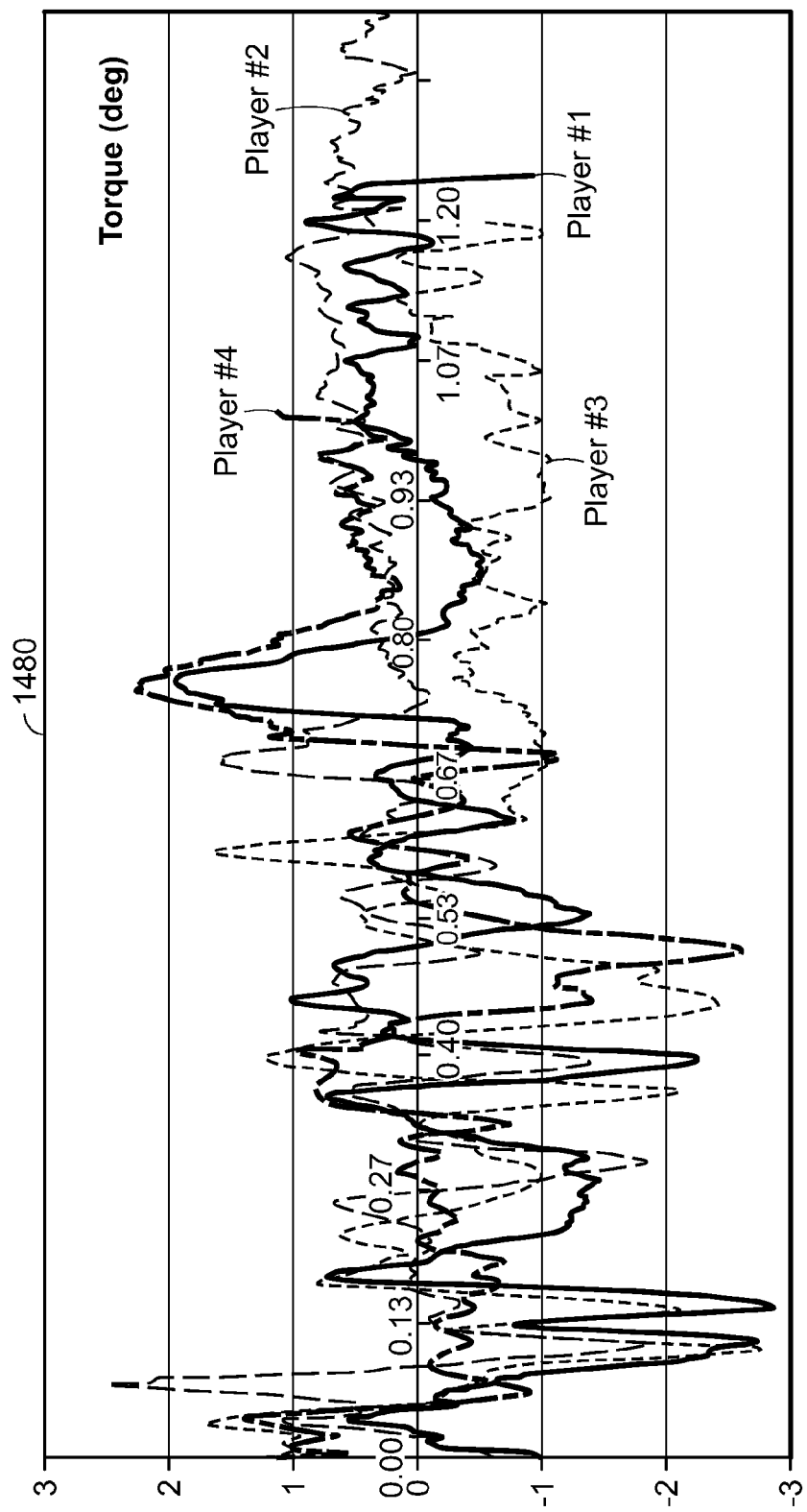
FIG. 14 shows multiple torque behavioral plots of a golf club as it is being swung by Player #1, Player #2, Player #3, and Player #4 in accordance with an exemplary embodiment of the present invention.

FIG. 14 of the accompanying drawings shows torque plots 1480 for different players, including the player whose swing-print is featured in FIG. 13. More specifically, FIG. 14 here replicates the swing-print of Player #1 in conjunction with Player #2, Player #3, and Player #4 to show how each individual golfer could have contrasting golf swings, but still have several of the dynamic behavioral characteristics be easily identifiable.

Figure 15:
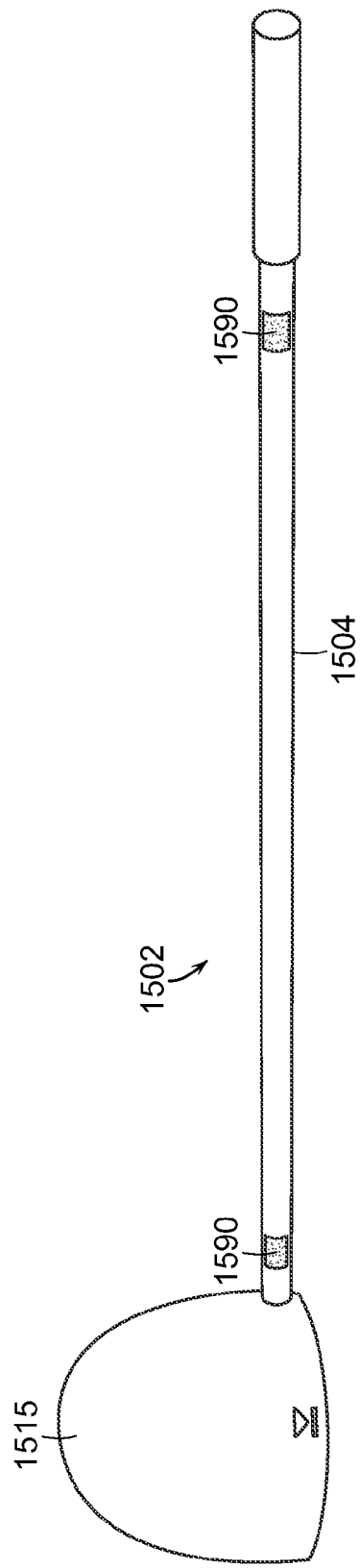
FIG. 15 shows a perspective view of a golf club including a plurality of sensors in accordance with an alternative embodiment of the present invention.

FIG. 15 of the accompanying drawings shows a perspective view of a golf club 1502 in accordance with an alternative embodiment of the present invention wherein a plurality of sensors 1590 are used to capture the dynamic behavioral characteristics of the golf club 1502 instead of using retrore-flective sensors. Although it may be preferred to use the plurality of retroreflective shown in FIG. 5, the number of cameras required for that particular embodiment may make it difficult for the entire system to be effectively replicated. Hence, in order to provide more mobility to the fitting process, the current embodiment uses a plurality of sensors 1590 that can be capable of capturing the location, velocity, acceleration, and orientation of each of the sensors 1590 without departing from the scope and content of the present invention. In one exemplary embodiment of the present invention, the plurality of sensors 1590 may generally be accelerometers, however numerous other types of sensors could be used without departing from the scope and content of the present invention so long as they are capable of capturing the information needed. More information regarding the functionality of the accelerometers can be found in U.S. Pat. No. 3,945,646 to Hammond, the disclosure of which is incorporated by reference in its entirety. It should be noted that FIG. 5 shows two sensors 1590 placed at the extremities of the golf club shaft 1504 in order to capture the behaviors of the entire golf club 1502; however, the sensors 1590 could be placed at various different locations on the golf club shaft 1504 or even on the club head 1515 to capture location specific data without departing from the scope and content of the present invention.

In this alternative embodiment of the present invention, a golfer's recommended shaft or shaft family can be determined by selectively positioning a plurality of sensors on a golf club, capturing a plurality of location data of the sensors using a computer processor, as the golfer performs the golf swing. Once the golf swing is performed, the computer processor calculated one or more dynamic behavioral characteristics of the golf club based on the plurality of location data captured to determine one or more preferred static shaft characteristics based on the one or more dynamic behavioral characteristics in order to select the recommended shaft or shaft family having one or more static shaft characteristics that most closely resembles the preferred static shaft characteristics.

Other than in the operating example, or unless otherwise expressly specified, all of the numerical ranges, amounts, values and percentages such as those for amounts of materials, moment of inertias, center of gravity locations, loft, draft angles, various performance ratios, and others in the aforementioned portions of the specification may be read as if prefaced by the word "about" even though the term "about" may not expressly appear in the value, amount, or range. Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting form the standard deviation found in their respective testing measurements. Furthermore, when numerical ranges of varying scope are set forth herein, it is contemplated that any combination of these values inclusive of the recited values may be used.

It should be understood, of course, that the foregoing relates to exemplary embodiments of the present invention and that modifications may be made without departing from the spirit and scope of the invention as set forth in the following claims.

What is claimed is:

1. A method of fitting a golfer to a recommended shaft comprising:
    providing a plurality of shaft families, each of the families having a substantially similar shaft response element and each shaft in the family having a different mechanical shaft characteristic;
    determining a swing force profile of said golfer's golf swing based on golf swing data;
    creating a database of a plurality of shaft profiles based on a static shaft test for a plurality of shaft families;
    simulating a plurality of shaft responses based on a combination of said swing force profile and said plurality of shaft profiles in said database;
    wherein said static shaft test further comprises;
    securing a grip end of a golf shaft to a static shaft testing apparatus;
    attaching said weight to a tip end of said golf shaft at different angles via a hook; and
    recording the deflection of said golf shaft for each of said different weights at two or more different angles, and
    simulating a plurality of performance results for each one of said plurality of shaft families based on said plurality of shaft responses,
    recommending a shaft family based on the shaft responses; and
    selecting a shaft from the shaft family having a preferred mechanical shaft characteristic.

2. The method of claim 1, wherein said plurality of performance results comprises at least one of a club head speed, a ball speed, a launch angle, a descent angle, a spin rate, an attack angle, a club path, a carry distance, a total distance, and a dispersion distance.

3. The method of claim 2, wherein said force profile of said golfer comprises a centrifugal force and a deflection force.

4. The method of claim 3, wherein said plurality of shaft responses comprises a shaft tip outward angle, a shaft tip downward angle, a torque angle, and an amount of deflection.

5. A method of fitting a golfer to a recommended shaft comprising:
- determining a swing force profile of said golfer's golf swing;
- creating a database of a plurality of shaft profiles based on a static shaft test for a plurality of shaft families;
- simulating a plurality of shaft responses based on a combination of said swing force profile and said plurality of shaft profiles in said database;
- simulating a plurality of performance results for each one of said plurality of shaft families based on said plurality of shaft responses, and
- recommending a shaft family based on the shaft responses and selecting a shaft from the shaft family having a preferred mechanical shaft characteristic,
- wherein said static shaft test further comprises;
  - securing a grip end of a golf shaft to a static shaft testing apparatus;
  - attaching a weight to a tip end of said golf shaft at different angles via a hook; and
  - recording the deflection of said golf shaft for each of said different weights at two or more different angles.

6. The method of claim 5, wherein said hook is a CG replicating hook.

7. The method of claim 5, wherein said hook is a balanced weight hook.

8. The method of claim 5, wherein said plurality of performance results comprises at least one of a club head speed, a ball speed, a launch angle, a descent angle, a spin rate, an attack angle, a club path, a carry distance, a total distance, and a dispersion distance.

9. The method of claim 8, wherein said force profile of said golfer comprises a centrifugal force and a deflection force.

10. The method of claim 9, wherein said plurality of shaft responses comprises a shaft tip outward angle, a shaft tip downward angle, a torque angle, and an amount of deflection.

11. The method of claim 5, wherein said static shaft test further comprises;
- attaching a plurality of different weights to a top end of said shaft at different angles via a balanced weight hook, and
- recording the deflection of said shaft for each of said different weights at each of said different angles.

* * * * *